United States Patent
Lazou et al.

(10) Patent No.: US 12,440,157 B2
(45) Date of Patent: Oct. 14, 2025

(54) SYSTEMS AND METHODS OF MONITORING FOOT PERFORMANCE USING A THERAPY BOOT

(71) Applicant: SportScientia LLC, South San Francisco, CA (US)

(72) Inventors: Panayiotis Lazou, Limassol (CY); Mark John Lake, Liverpool (GB); Andrew Gray, Lilli Pilli (AU)

(73) Assignee: SPORTSCIENTIA PTE. LTD., Singapore (SG)

( * ) Notice: Subject to any disclaimer, the term of this patent is extended or adjusted under 35 U.S.C. 154(b) by 829 days.

(21) Appl. No.: 17/564,028

(22) Filed: Dec. 28, 2021

(65) Prior Publication Data
US 2022/0202365 A1 Jun. 30, 2022

Related U.S. Application Data

(60) Provisional application No. 63/130,964, filed on Dec. 28, 2020.

(51) Int. Cl.
*A61B 5/00* (2006.01)
*A61B 5/0205* (2006.01)
(Continued)

(52) U.S. Cl.
CPC .......... *A61B 5/6807* (2013.01); *A61B 5/0002* (2013.01); *A61B 5/0077* (2013.01);
(Continued)

(58) Field of Classification Search
CPC . A61B 5/0002; A61B 5/0077; A61B 5/02055; A61B 5/02438; A61B 5/1038;
(Continued)

(56) References Cited

U.S. PATENT DOCUMENTS 8,739,639 B2   6/2014  Owings et al.
8,790,224 B1 *  7/2014  Davis ................. A63B 21/0004
                                                        441/59
(Continued)

FOREIGN PATENT DOCUMENTS

CN      106821332 A  *  6/2017  ............... A61B 5/01
GB      2602250 A       6/2022
(Continued)

OTHER PUBLICATIONS

English translation of CN-106821332-A (Year: 2017).*
(Continued)

*Primary Examiner* — Alex M Valvis
*Assistant Examiner* — Anna Roberts
(74) *Attorney, Agent, or Firm* — NIXON PEABODY LLP

(57) ABSTRACT

A motion analytics system is disclosed having a therapy boot, a camera for capturing motion of the therapy boot, and an external computing device. The therapy boot includes a foot portion, a shank portion, and a sole portion. The shank portion is disposed adjacently above the foot portion. The sole portion is disposed under the foot portion and includes sensors configured to detect motion of a user's foot. The external computing device receives motion data from the sensors and performs a data analytics method. The method includes organizing the received data; filtering at least a portion of the organized data through a frequency-based signal processing filter to remove background noise and interference; determining analytical data associated with foot factors based on the filtered data; and categorizing the determined analytical data to provide context and insight about the user's motion.

23 Claims, 13 Drawing Sheets

(51) Int. Cl.
  *A61B 5/024* (2006.01)
  *A61B 5/11* (2006.01)
  *A61B 5/389* (2021.01)
  *G16H 20/30* (2018.01)
  *G16H 40/67* (2018.01)

(52) U.S. Cl.
  CPC .......... *A61B 5/02055* (2013.01); *A61B 5/112* (2013.01); *A61B 5/1128* (2013.01); *A61B 5/486* (2013.01); *A61B 5/6843* (2013.01); *A61B 5/725* (2013.01); *A61B 5/7267* (2013.01); *G16H 20/30* (2018.01); *G16H 40/67* (2018.01); *A61B 5/02438* (2013.01); *A61B 5/389* (2021.01); *A61B 2503/40* (2013.01); *A61B 2505/09* (2013.01); *A61B 2560/0214* (2013.01); *A61B 2562/0219* (2013.01); *A61B 2562/0223* (2013.01); *A61B 2562/0261* (2013.01); *A61B 2562/164* (2013.01); *A61B 2562/166* (2013.01)

(58) Field of Classification Search
  CPC ....... A61B 5/112; A61B 5/1128; A61B 5/389; A61B 5/486; A61B 5/6807; A61B 5/6812; A61B 5/6829; A61B 5/6843; A61B 5/725; A61B 5/7267; A61B 2503/10; A61B 2503/40; A61B 2505/09; A61B 2560/0214; A61B 2560/0456; A61B 2562/0219; A61B 2562/0223; A61B 2562/0247; A61B 2562/0261; A61B 2562/164; A61B 2562/166; G16H 20/30; G16H 40/67; A61H 2201/0115; A61H 2203/02; A63B 31/11; B63C 9/13
  See application file for complete search history.

(56) References Cited

U.S. PATENT DOCUMENTS

| | | |
|---|---|---|
| 9,763,489 B2 | 9/2017 | Amos et al. |
| 10,182,744 B2 | 1/2019 | Amos et al. |
| 10,357,078 B2 | 7/2019 | Rice et al. |
| 10,398,189 B2 | 9/2019 | Amos et al. |
| 10,674,782 B2 | 6/2020 | Molyneux et al. |
| 11,026,469 B2 | 6/2021 | Molyneux et al. |
| 2011/0054359 A1* | 3/2011 | Sazonov ............... A61B 5/4866 600/595 |
| 2011/0175744 A1* | 7/2011 | Englert ................ A43C 11/165 702/41 |
| 2013/0213145 A1* | 8/2013 | Owings ................ G01L 1/2287 73/862.046 |
| 2014/0199902 A1* | 7/2014 | Suciu .................... A63B 31/11 441/64 |
| 2016/0345902 A1* | 12/2016 | Degreef ............... A61B 5/0022 |
| 2018/0132758 A1* | 5/2018 | Benford ................ A61B 5/112 |
| 2018/0192514 A1* | 7/2018 | Seo ...................... H05K 1/0281 |
| 2018/0280764 A1* | 10/2018 | Snell ..................... A63B 31/10 |
| 2019/0246734 A1 | 8/2019 | Nurse et al. |
| 2023/0310249 A1* | 10/2023 | Paik .................... A61H 1/0266 482/4 |

FOREIGN PATENT DOCUMENTS

| | | |
|---|---|---|
| WO | 2022064451 A1 | 3/2022 |
| WO | 2022147052 A2 | 7/2022 |

OTHER PUBLICATIONS

GB Office Action for Application No. 2311692.4, mailed Mar. 6, 2024, 6 pp.

Fantozzi S. et al., "Gart Kinematic Analysis in Water Using Wearable Inertial Magnetic Sensors", PLOS ONE, (Sep. 14, 2015), 12 pp., USA Retrieved from the Internet: URL:https://journals.plos.org/plosone/article/file?id=10.1371/journal.pone.0138105&type=printable.

International Search Report in International Patent Application No. PCT/US2021/065406 mailed Jun. 28, 2022 (6 pp.).

Written Opinion in International Patent Application No. PCT/US2021/065406 mailed Feb. 11, 2020 (16 pp.).

International Search Report with a front page revision of publication in International Patent Application No. PCT/US2021/065406 mailed Jun. 28, 2022 (7 pp.).

Tahir M. N. et al., "IoT -Motion Sensor Device and Data Analysis: (Motion Detection and Step-Count Algorithm)", 2020 International Conference On Computing and Information Technology, Saudi Arabia, (Sep. 9th and 10th, 2020), EEE, vol. 1, No. ICCIT -1441, (pp. 428-432) 5 pp.

He Zexia et al., "A Wearable Sensing and Training System: Towards Gait Rehabilitation for Elderly Patients With Knee Osteoarthritis", IEEE Sensors Journal, IEEE, vol. 19, No. 14, (Jul. 15, 2019), pp. 5936-5945, USA.

\* cited by examiner

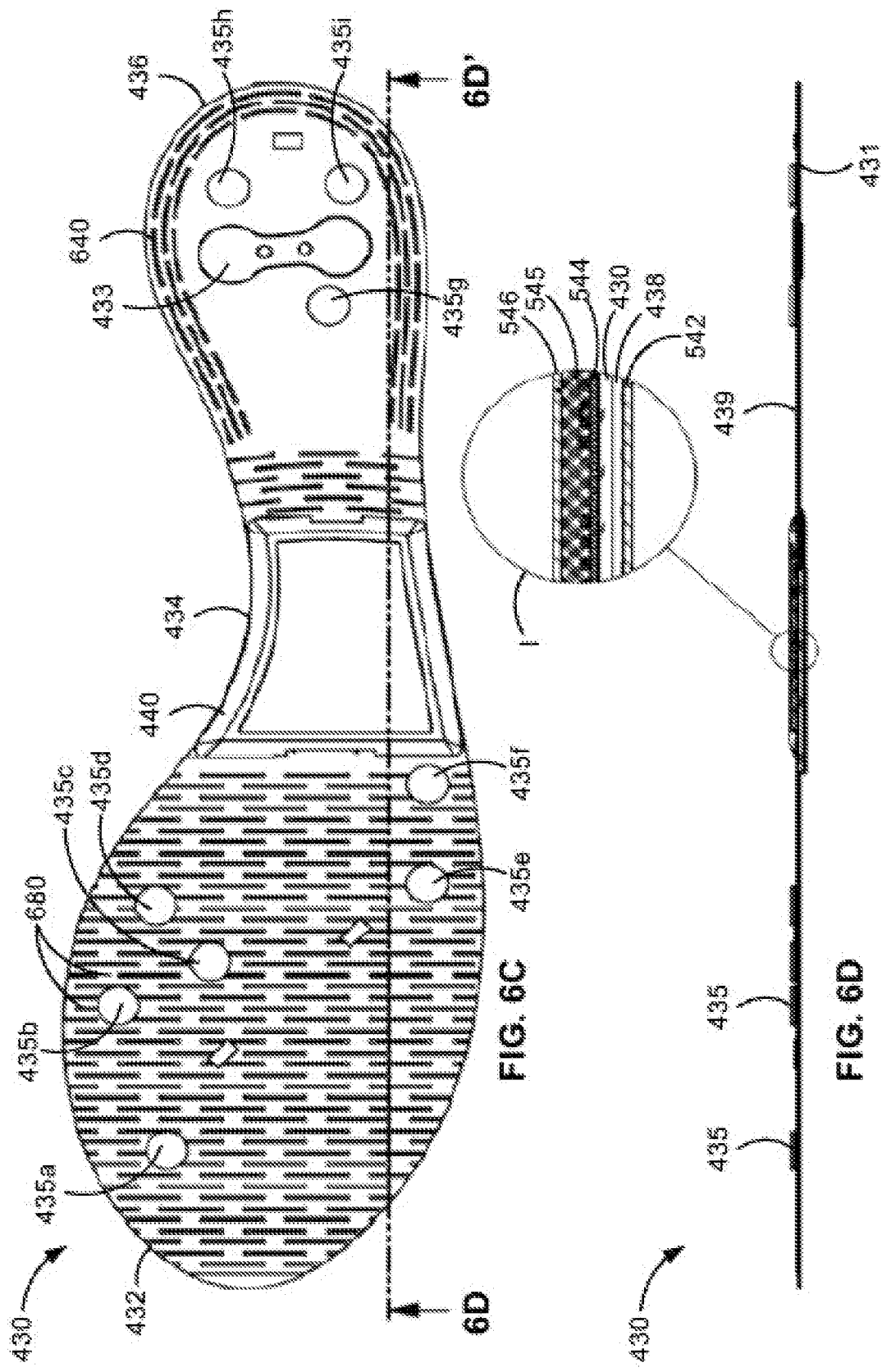

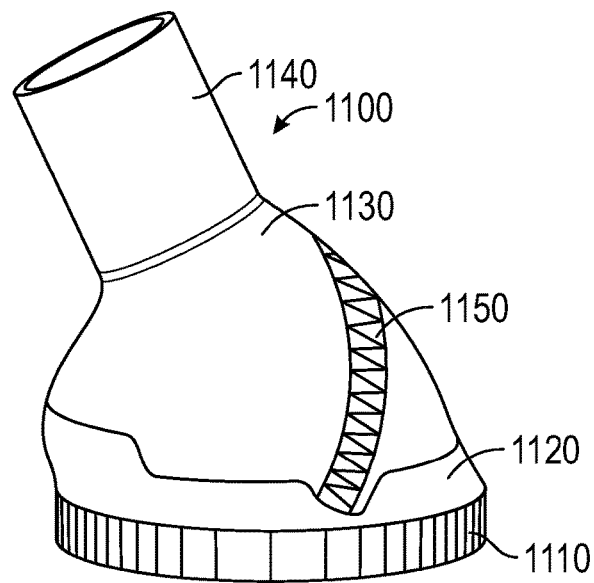
FIG. 11A
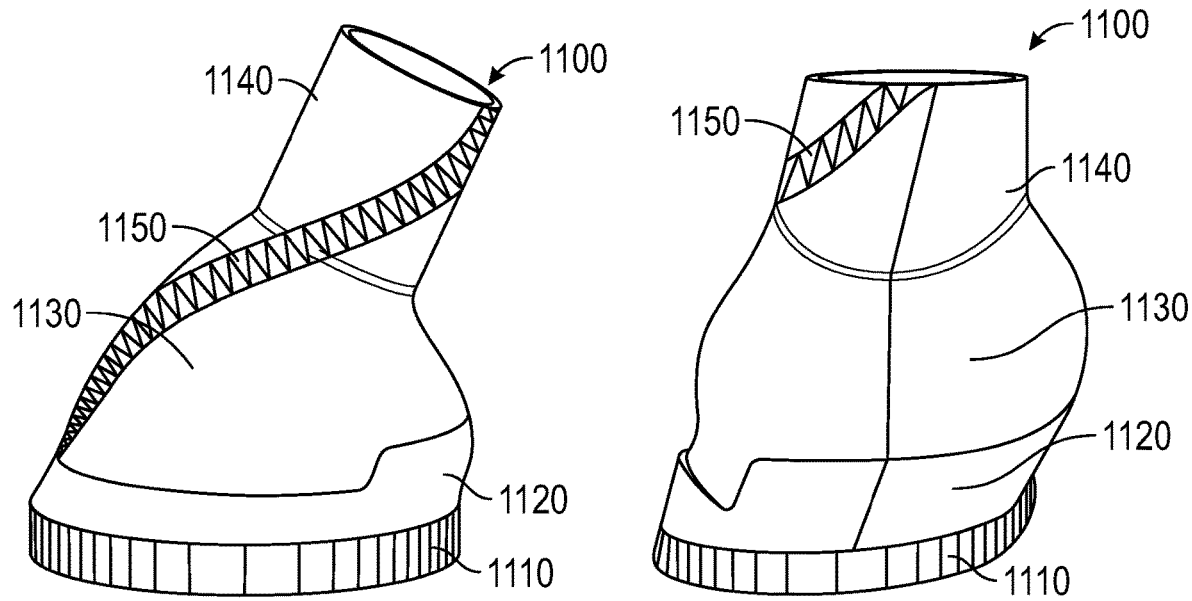
FIG. 11B
FIG. 11C

SYSTEMS AND METHODS OF MONITORING FOOT PERFORMANCE USING A THERAPY BOOT

CROSS-REFERENCE TO RELATED APPLICATIONS

This application claims the benefit of, and priority to, U.S. Provisional Patent Application No. 63/130,964 filed on Dec. 28, 2020, which is hereby incorporated by reference herein in its entirety.

FIELD OF THE INVENTION

The present invention relates generally to monitoring human health metrics, and more specifically, to systems and methods of monitoring foot performance of humans and animals using sensors in a sole portion of a therapy boot.

BACKGROUND OF THE INVENTION

Injuries that affect a person's gait and other physical movements occur in a variety of manners, due to sports activity, poor training methods, unsafe training environments, deterioration of muscles, tendons, joints and ligaments due to aging, and general clumsiness. When an injury is located in the foot and/or ankle, the injury is treated by partially or fully immobilizing the foot and/or ankle. The healing process is monitored by physical therapy and health professionals who: (i) monitor range of motion of the foot; and (ii) rely on verbal diagnosis of pain accompanying movement from the patient. Conventional monitoring processes do not provide a holistic view of the healing process because they are limited by the linguistic ability of a patient to describe pain and discomfort. In many examples, the patient does not give a full picture of lingering pain and discomfort to the health professional, which can result in inaccurate diagnoses during physical therapy or an inaccurate timeline for healing. In some examples, this leads to repeat injuries, when, for example, the health professional inaccurately believes that the patient has a small enough amount of discomfort that the patient can be cleared for regular movement. If the injury is not fully healed, the patient is at a higher risk of injury if he fully relies on his foot while running or walking.

It is imperative to receive continuous assessments of athletes during any activity such that any assumptions related to performance and injury be validated. Currently, biomechanical demands are estimated using trunk-mounted inertial measurement units (IMUs) that monitor the shock being transmitted from the foot to the trunk. This has been criticized by sports and medical practitioners because the sensor data is prone to vibration errors. In addition to not monitoring the transient loads well, IMUs cannot measure the compressive loads acting on the body during dynamic movements. IMUs also lack sensitivity in quantifying individual limb loading due to their positioning on the upper trunk.

Further, 'athlete load' and other markers related to intensity of movements often rely on acceleration characteristics of the upper portion of the back as measured by a Global Positioning System (GPS) device. This assumes that intensity of movements is solely a function of acceleration characteristics as a substitute for the ground reaction forces, and therefore, provides a wholesome understanding of vulnerability to any specific injury. However, GPS devices have limited ability to measure how much load is experienced in any specific anatomical structure from foot to neck, and should only be one consideration when assessing 'athlete load', performance, and risk of injury.

To address these issues, the systems, methods, and the therapy boot described herein, allow measuring the entire force-time history of loading experienced directly at the point of foot-ground interaction. While evidence-based research in sports medicine has become an important component of minimizing injury risk and providing rehabilitative care after injury, there remains an ongoing need to develop systems and methods that monitor and record high-quality evidential data in order to make the prevention, treatment, and rehabilitation of injuries more impactful. In particular, systems and methods that monitor and record data would help provide a continuous stream of real-time and environmental data that can address any gap in understanding the dynamics of performance before, during, after, and even in absence of injury. Such data would help determine external parameters of performance and internal parameters of how the body is responding to the demands of training and open play. While the external parameters are the face-value markers that can be used as performance snapshots relating to overall intensity and tactical play, the internal parameters provide information about risk of injury and may provide a basis of specific conditioning and rehabilitation after a training or playing session.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a therapy boot includes a foot portion, a shank portion, and a sole portion. The shank portion is disposed adjacently above the foot portion. The sole portion is disposed under the foot portion. The sole portion has a plurality of sensors configured to detect motion of a user's foot wearing the therapy boot.

According to certain aspects of the present disclosure, a motion analytics system includes a therapy boot, a camera, and at least one external computing device communicatively coupled to the camera and the therapy boot. The therapy boot includes a foot portion, a shank portion, and a sole portion. The shank portion is disposed adjacently above the foot portion. The sole portion is disposed under the foot portion. The sole portion has a plurality of sensors configured to detect motion of a user's foot wearing the therapy boot. The camera is configured to capture images of the motion of the therapy boot. The at least one external computing device is communicatively coupled to the camera and the therapy boot for performing data analytics on motion data of the user of the therapy boot.

According to certain aspects of the present disclosure, a data analytics method includes receiving at least a portion of motion data of a user generated by one or more sensors and organizing the received data. The data analytics method further includes filtering at least a portion of the organized data through a frequency-based signal processing filter to remove background noise and interference therefrom. The data analytics method further includes determining analytical data associated with one or more foot factors based on the filtered data. The data analytics method further includes categorizing the determined analytical data to provide context and insight to the user about the user's motion.

According to certain aspects of the present disclosure, a motion analytics system is disclosed. The motion analytics system includes a footwear device having one or more sensors configured to detect motion of a user, and an external computing device. The external computing device includes a processor configured to receive motion data generated by the one or more sensors and a non-transitory processor-readable memory coupled to the processor. The non-transitory processor-readable memory includes machine-readable instructions stored thereon that, when executed by the processor, causes the external computing device to perform a number of steps of a data analytics method. The data analytics method includes organizing the received data and filtering at least a portion of the organized data through a frequency-based signal processing filter to remove background noise and interference therefrom. The data analytics method further includes determining analytical data associated with one or more foot factors based on the filtered data. The data analytics method further includes categorizing the determined analytical data to provide context and insight to the user about the user's motion.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 6C is a bottom view of the flexible printed circuit board of FIG. 6A disposed within the sole portion of FIG. 4A, according to certain aspects of the present disclosure.

FIG. 6D is a side view of the flexible printed circuit board of FIG. 6A disposed within the sole portion of FIG. 4A, according to certain aspects of the present disclosure.

FIG. 11A shows side perspective view of a therapy boot for a horse's hoof, according to certain aspects of the present disclosure.

FIG. 11B shows a front perspective view of the therapy boot of FIG. 11A, according to certain aspects of the present disclosure.

FIG. 11C shows a rear perspective rear view of the therapy boot of FIG. 11A, according to certain aspects of the present disclosure.

Figure 1:
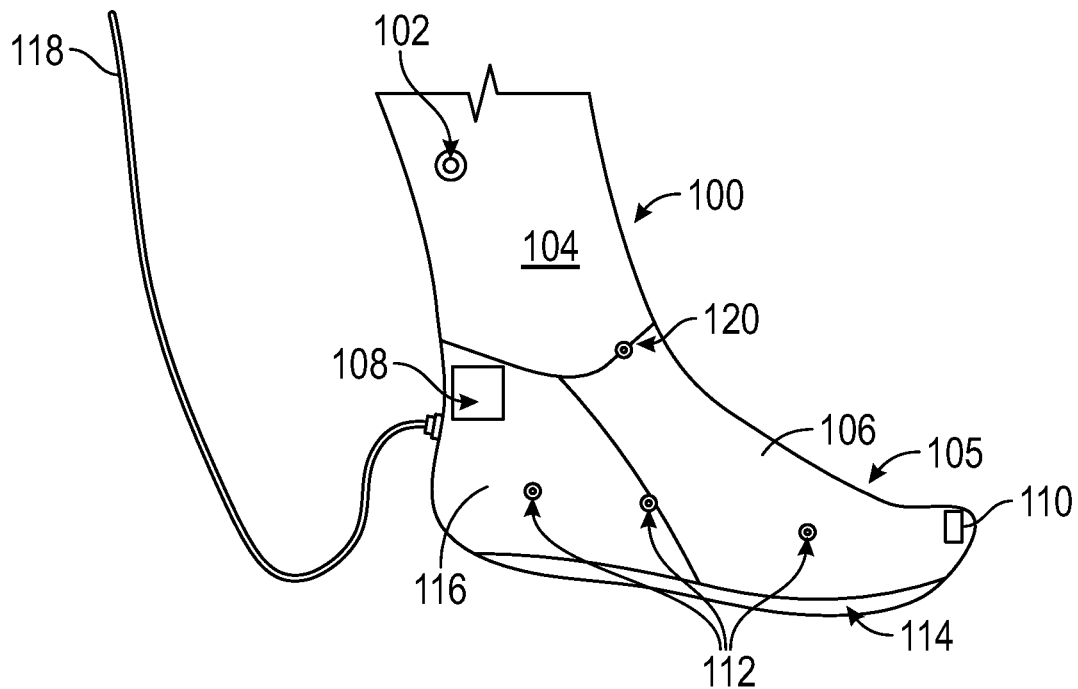
FIG. 1 shows a side view of a first embodiment of a therapy boot with a sole portion for capturing motion data of a user, according to certain aspects of the present disclosure.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein. Further, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like.

Embodiments of the disclosure are directed to systems and methods of monitoring foot performance of humans and animals using sensors in a sole portion of a therapy boot. The sole portion includes a number of sensors including force-sensitive resistors, three-axis accelerometers, three-axis gyroscopes, magnetometers, temperature sensors, electromyography sensors and the like. These sensors, as well as inertial sensors on the therapy boot are configured to generate motion data associated with the motion of a user wearing the therapy boot. The user may be a human, or an animal like a horse, camel, etc. An external computing device performs a data analytics routine to provide output data for context and insight on the motion to the user. The output of the data analytics routine may be used to present interactive visualizations on the motion of the user, as well as provide a predictive feedback on the motion of the user's feet of the user. The predictive feedback may be determined by a machine learning algorithm. Various beneficial features of the therapy boot, the sole portion of the therapy boot, and the data analytics method are discussed below, or will become obvious in light thereof.

Referring to the drawings, FIG. 1 shows a side view of a first embodiment of a therapy boot 100 that may be worn by a user. In some embodiments, the therapy boot 100 provides monitoring of physical therapy/rehabilitation and analysis of the effectiveness of the therapy/rehabilitation of the user. However, the present disclosure contemplates that the therapy boot 100 is not limited to therapy applications, and can be used to evaluate other characteristics of walking, running, or movement for diagnostic analysis. Further, the therapy boot 100 may include various features and components such as those described in, the PCT patent application PCT/IB2021/058746, which is hereby incorporated by reference herein in its entirety.

The therapy boot 100 includes a foot portion 105, a shank portion 104, and a sole portion 114. In some embodiments, the foot portion 105, the shank portion 104, and the sole portion 114 are separate pieces permanently attached to each other, while in other embodiments, the foot portion 105, the shank portion 104, and the sole portion 114 form an integrated piece. In some embodiments, one or more of the foot portion 105, the shank portion 104, and the sole portion 114 is made from neoprene or another waterproof material. In different embodiments, any or all of the components of the therapy boot 100 can be made from a waterproof material. In some embodiments, the therapy boot 100 has a shape corresponding to a known shoe size (e.g., 9, 9.5, 10, 10.5, 11, 11.5, etc.).

The shank portion 104 is disposed adjacently above the foot portion 105. The shank portion 104 includes a first valve 102 and an inner lining (not visible), which is configured to inflate and deflate by air flowing in and out, respectively, through the first valve 102. This secures the user's foot in the therapy boot 100. The first valve 102 is self-adjusting in nature to ensure there is no relative motion between the user's foot and the therapy boot 100. In some embodiments, distance sensors and pressure sensors (not shown) may be mounted on the inner lining and used to take measurement of the user's foot and its pressure against the inner lining respectively. The measurement of the user's foot taken by the distance sensors is then sent to a processor, either on the therapy boot 100 or in an external computing device, which subsequently activates the first valve 102 to snugly secure the user's foot in the therapy boot 100. Once the pressure sensors detect the pressure between the user's foot and the therapy boot 100 as being optimally snug, the first valve 102 is deactivated. In some embodiments, the inner lining extends over an entire interior surface of the therapy boot 100 and can include a number of sensors such as an inertial sensor, heart sensor, temperature sensor, etc. The inner lining, when inflated, secures the user's foot within the therapy boot 100 by providing a high-pressure water-tight seal between the user's foot and the therapy boot 100. This allows any sensors on the inner lining to become flush with and contact the user's skin.

The foot portion 105 is shaped based on whether the user is a human, a horse, a camel, or another animal of interest. In the embodiment shown in FIG. 1, the foot portion 105 is shaped for a human foot. Different foot sizes may be accommodated by inflation of the inner lining and/or having different sized boots. The foot portion 105 includes a vamp portion 106 and a heel portion 116 coupled to a posterior end of the vamp portion 106. In some embodiments, a coaxial antenna cable 118 is attached to the foot portion 105. The coaxial antenna cable 118 is configured to transmit motion data of the user's feet captured by sensors to an external computing device, as discussed below with respect to FIG. 3. In some embodiments, the coaxial antenna cable 118 is a Wi-Fi® extension cable communicatively coupled to electronic circuitry and sensors of the therapy boot 100.

In some embodiments, the foot portion 105 includes an inner surface where one or more lateral sensors are disposed and configured to measure shear force on the therapy boot 100. In the example of FIG. 1, one or more lateral sensors 112 are disposed on an inner surface (not shown) of the foot portion 105. In some embodiments, the lateral sensors 112 may be positioned on the vamp portion 106, or the heel portion 116, or both. Thus, the lateral sensors 112 measure impact on the user's foot when the user wears the therapy boot 100. In some embodiments, the lateral sensors 112 may be positioned on the inner surface of the foot portion 105 to contact the user's skin.

In some embodiments, an inertial sensor 120 is coupled to the shank portion 104 and/or the foot portion 105. The inertial sensor 120 is configured to detect motion data associated with translational and rotational motion of the user while wearing the therapy boot 100 and hence relates to inertial forces produced by the user's feet while moving.

In some embodiments, a heart rate sensor 108 is coupled to the shank portion 104 and/or the foot portion 105. In the example shown in FIG. 1, the heart rate sensor 108 is positioned on an interior section of the heel portion 116 such that it abuts the user's foot. By direct contact with the user's skin, the heart rate sensor 108 is configured to detect a heart rate of the user while wearing the therapy boot 100. In other embodiments, the heart rate sensor 108 is positioned anywhere on the therapy boot 100 that enables contact with the user's skin. Some examples of the heart rate sensor 108 include a pulse sensor, an electrode, an electrocardiography (ECG) sensor, a photoplethysmography (PPG) sensor, and the like.

In some embodiments, an energy-harvesting sensor 110 is coupled to the foot portion 105. The energy-harvesting sensor 110 is placed on a position on the therapy boot 100 which corresponds to a maximal amount of movement through physical space. The energy harvesting sensor 110 generates kinetic energy from the motion of user's foot wearing the therapy boot 100. The kinetic energy may be used for powering electronic components of the therapy boot 100 or charging a power source therein.

The sole portion 114 is disposed under the foot portion 105 and includes a plurality of sensors configured to detect motion data of a user wearing the therapy boot 100, as further described in detail below. The motion data is quantitative in nature and represents the load, force distribution, and gait characteristics of the user. The motion data includes data corresponding to foot orientation, movement, and position of the user's feet. For example, the motion data identifies how much force the user's foot is able to withstand. In some embodiments, the motion data is used to identify whether the user walks with proper weight distribution during each stride. In some embodiments, the motion data may be continuous time series data, while in others, the motion data may be discrete in nature obtained at predetermined time intervals.

Figure 2A:
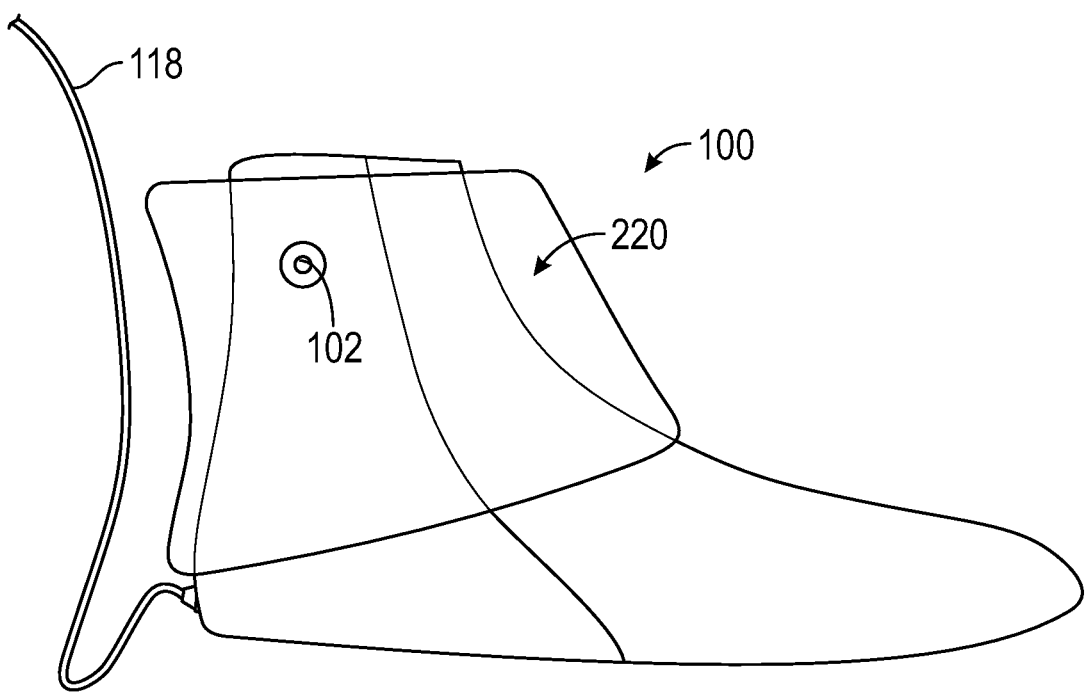
FIG. 2A shows a side view of an inflatable air sleeve wrapped around the therapy boot of FIG. 1, according to certain aspects of the present disclosure.

FIG. 2A shows a side view of an inflatable air sleeve 220 wrapped around the therapy boot 100. In some embodiments, such as shown in FIG. 2A, the inflatable air sleeve 220 is axially wrapped around the shank portion 104 of the therapy boot 100. However, in different embodiments, the inflatable air sleeve 220 may be wrapped around different locations of the therapy boot 100. Regardless of configuration, the inflatable air sleeve 220 is in aerial communication with the inner lining of the shank portion 104 and inflates or deflates with the inflation or deflation of the inner lining, respectively.

Figure 2B:
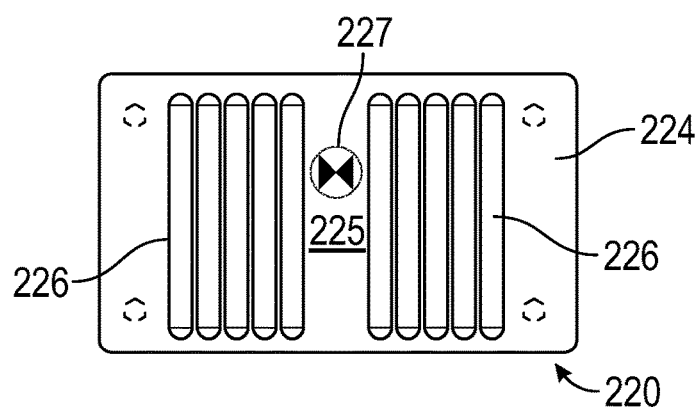
FIG. 2B shows a top view of an interior surface of the inflatable air sleeve of FIG. 2A in straightened form, according to certain aspects of the present disclosure.
Figure 2D:
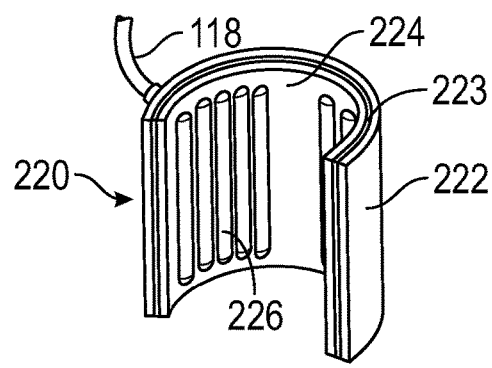
FIG. 2D shows a perspective view of the inflatable air sleeve of FIG. 2A in curled form as when wrapped around the therapy boot of FIG. 1, according to certain aspects of the present disclosure.
Figure 2C:
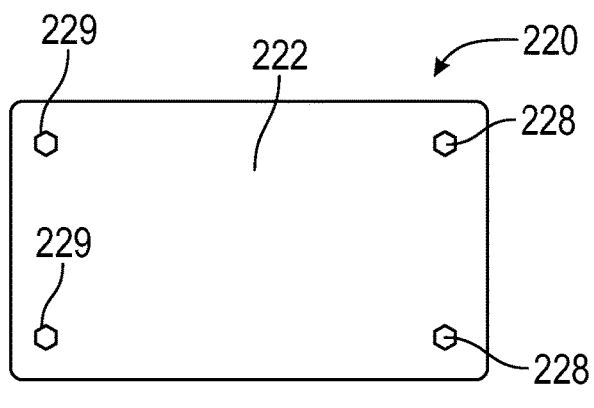
FIG. 2C shows a top view of an exterior surface of the inflatable air sleeve of FIG. 2A in straightened form, according to certain aspects of the present disclosure.

FIG. 2B shows a top view of an interior surface 224 of the inflatable air sleeve 220 in straightened form, while FIG. 2C shows a top view of an exterior surface 222 of the inflatable air sleeve 220 also in straightened form. The exterior surface 222 includes a first set of mating elements 228 (e.g., magnetic snaps, Velcro® hook or loop, etc.) at one end and a second set of mating elements 229 (e.g., magnetic snaps, Velcro® loop or hook, etc.) at the opposite end. The first set of mating elements 228 are configured to mate with the second set of mating elements 229, when the inflatable air sleeve 220 wraps around the shank portion 104.

As shown in FIG. 2B, the interior surface 224 includes a plurality of air chambers 226 disposed on either side of a gap area 223. The gap area 223 aligns with a portion of the shank portion 104 above the heel portion 116. A second valve 227 is positioned in the gap area 223. The second valve 227 fluidly connects with the first valve 102 such that air from the inner lining of the shank portion 104 can flow into the plurality of air chambers 226. The second valve 227 can be controlled automatically or manually. In some embodiments, control of the second valve 227 and corresponding inflatability of the inflatable air sleeve 220 helps the therapy boot 100 achieve the necessary buoyancy to float under a water level when a user wears the therapy boot 100 in a water tank for aquatic rehabilitation.

Figure 2E:
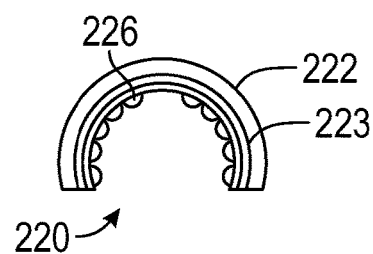
FIG. 2E shows a top view of the inflatable air sleeve of FIG. 2A in curled form as when wrapped around the therapy boot of FIG. 1, according to certain aspects of the present disclosure.

FIG. 2D and FIG. 2E show a perspective view and a top view of the inflatable air sleeve 220 in curled form as when wrapped around the shank portion 104 of the therapy boot 100 (FIG. 1), respectively. As demonstrated, the plurality of air chambers 226 on either side of the gap area 223 are disposed above the heel portion 116 around the ankle of the user. The inflatable air sleeve 220 may be placed on the therapy boot 100. Therapy boots worn on both the left foot and right foot of the user may have the corresponding air sleeves inflated to establish neutral buoyancy when underwater and positive buoyancy on the surface, when needed. The buoyancy is controlled by adjusting the volume of air in the inflatable air sleeve 220 of each therapy boot 100 using an external buoyancy control console (not shown), which includes a depth gauge. The function of the external buoyancy control console is to automatically or manually adjust buoyancy while part of the user's feet are submerged underwater to allow neutral buoyancy to be maintained during aquatic therapy.

Figure 3A:
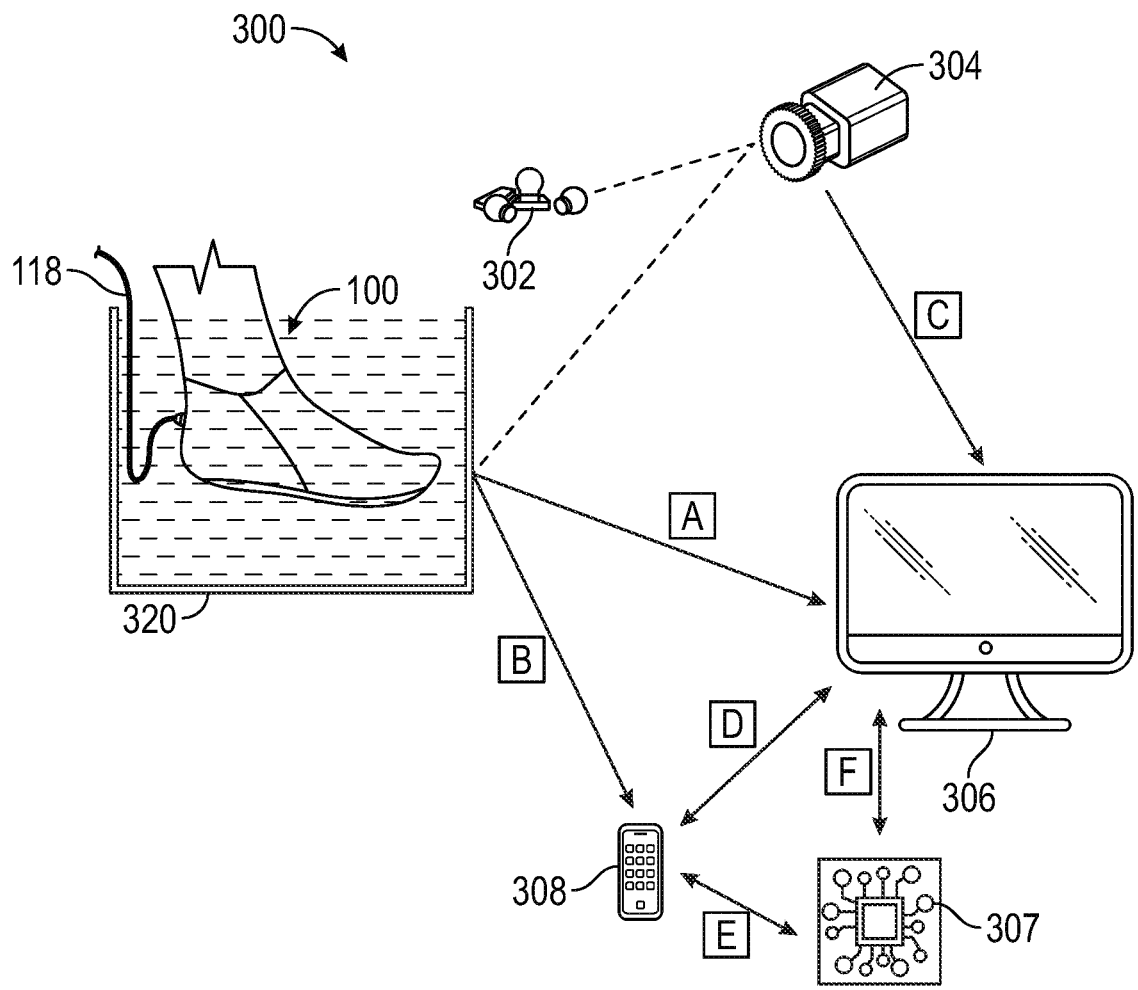
FIG. 3A shows a schematic representation of a first embodiment of a motion analytics system having the therapy boot of FIG. 1, according to certain aspects of the present disclosure.

FIG. 3A shows a schematic representation of a first embodiment of a motion analytics system 300 including the therapy boot 100 when used in conjunction with an underwater instrumented treadmill during aquatic therapy. Feet movement such as walking and jogging may be monitored during the aquatic therapy and used to determine load, force distribution, and gait. In this embodiment, the therapy boot 100 is used in a water tank 320 to rehabilitate a foot injury, as well as other leg injuries such as an anterior cruciate ligament (ACL) injury since reduced gravity reduces impact of feet movement under water.

The types of therapy performed using the therapy boot 100 during aquatic therapy include improving range of motion, endurance testing, gait practice, musculoskeletal strength and circulation, while also decreasing swelling and pain in the process. The motion data generated while wearing the therapy boot 100 includes dynamic stress load, balance, injury prevention, rehabilitation, performance enhancing across all movement orientated components, injury prediction and testing programs. This helps simultaneous modification of both three-dimensional buoyancy and resistive forces at the interface between the therapy boot 100 and the floor of the water tank 320. Accordingly, such feedback facilitates an understanding of the progress of the rehabilitation process.

The motion analytics system 300 includes the therapy boot 100, a plurality of markers 302, a camera 304, external computing devices such as the remote computing device 306, a remote machine learning processor 307, and the user computing device 308. The external computing devices are communicatively coupled to the camera 304, as well as the therapy boot 100 using the coaxial antenna cable 118.

The remote computing device 306 includes a processor and a memory device coupled to the processor. The processor of the remote computing device 306 is configured to receive, perform pre-processing operations on, and store the motion data generated by the therapy boot 100 received through the communication channels A and/or B respectively. The communication channels A and B represent communication from the therapy boot 100 after establishing the channels with either the remote computing device 306 or the user computing device 308.

The memory device of the remote computing device 306 is a non-transitory processor-readable memory and has a machine-readable instruction set for execution by the processor of the remote computing device 306 to perform a data analytics method such as, but not limited to, the data analytics method 1300 discussed with respect to FIG. 13 below. The memory device may comprise RAM, ROM, flash memories, non-volatile memory, solid state drives, hard drives, or any non-transitory memory device capable of storing a machine-readable instruction set which can be accessed and executed by the processor of the remote computing device 306. In some embodiments, there may be more than one memory device. For example, ROM or flash memory may be used to store operating firmware, while RAM may be used to temporarily store sensor data. The memory device is configured to store at least about eight hours of data collected from the sensors (e.g., sensors 108, 110, 112, 120 of FIG. 1 and the sensors on the sole portion 114 described herein) on the therapy boot 100.

The machine-readable instruction set may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the non-transitory computer-readable memory device. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The user computing device 308 includes a processor and a memory device that are substantially similar in structure and function to the processor and the memory device, respectively, of the remote computing device 306. The user computing device further includes a display (e.g., a cathode ray tube, light emitting diodes, liquid crystal displays, plasma displays etc.) configured to present interactive visualizations and output data relating to a predictive feedback on the motion of the user. The visualizations and predictive feedback are based on the motion data generated by sensors of the therapy boot 100. Additionally, the display can be a touch screen that, in addition to providing visual information, detects the presence and location of a tactile input upon a surface of or adjacent to the display and thus provides an input device for a user. Accordingly, the display can receive mechanical input directly upon the optical output provided thereby.

In some embodiments, the user computing device 308 is communicatively coupled to the therapy boot 100, via a wireless or wired connection. In other embodiments, the coaxial antenna cable 118 of FIG. 1 provides a wired connection between the user computing device 308 and the therapy boot 100 to transmit motion data of the user. For example, the user computing device 308 may be a smart phone, smart watch, a tablet, a laptop, a computer, or any other computer system. In some embodiments, the user computing device 308 receives visual or camera data from the camera 304. In some embodiments, the remote computing device 306 and the user computing device 308 are a single unitary device.

The remote machine learning processor 307 is configured to process large amounts of data generated by the sensors in the therapy boot 100 using one or more machine learning algorithms to detect patterns, classify features, and determine one or more predictive feedbacks from user motion. The predictive feedbacks may include information related to any one or any combination of symmetrical distribution of forces on the feet of the user during a motion, likelihood of injury of the user, one or more patterns of injury of the user, a recommended course of action to prevent an injury to the user, among others. In some embodiments, the predictive feedback may enable modules to compute injury probabilities and analyze performance for the potential mitigation of recurring injuries.

The machine learning algorithms may include supervised learning, unsupervised learning, semi-supervised learning, human-in-the-loop learning, reinforcement learning, support vector machine, cluster analysis, hierarchical clustering, anomaly detection, deep learning, convolutional neural networks, and the like. For example, a predictive feedback may be learned from a training data set with motion data and the resulting output. In some embodiments, the motion data generated by the therapy boot 100, as well as the processed and analyzed data may be securely stored in a block chain to ensure that the raw motion data and the processed and analyzed motion data are stored as an unfalsifiable, traceable, and time-stamped permanent record of motion of the user. Of course, other security measures may also be taken to protect user data such as unique passwords, digital encryption, public/private key signature authentication, etc. In some embodiments, deep learning techniques may be used to better understand any deviation in a user's posture and technique.

The therapy boot 100 communicates with the remote computing device 306 through a first unidirectional communication channel A, and the user computing device 308 through a second unidirectional communication channel B. The camera 304 communicates with the remote computing device 306 through a third unidirectional communication channel C. The remote computing device 306 communicates to the user computing device 308 through a first bidirectional communication channel D. The user computing device 308 communicates with the remote machine learning processor 307 through a second bidirectional communication channel E, while the remote computing device 306 communicates with the remote machine learning processor 307 through a third bidirectional communication channel F. In preferred embodiments, any one or any combination of the communication channels A, B, C, D, E, and F form a network that may include one or more cellular networks, satellite networks and/or computer networks such as, for example, a wide area network, a local area network, personal area network, a global positioning system and combinations thereof. Suitable local area networks may include wired Ethernet and/or wireless technologies such as, for example, wireless fidelity (Wi-Fi®). Suitable personal area networks may include wireless technologies such as, for example, IrDA, Bluetooth®, Wireless USB, Z-Wave, ZigBee®, and/or other near field communication protocols. Suitable cellular networks include, but are not limited to, technologies such as LTE, WiMAX, UMTS, CDMA, and GSM.

The camera 304 is configured to capture image and/or video data on the motion of the therapy boot 100 and/or the user of the therapy boot 100 by following the plurality of markers 302. In some embodiments, the camera 304 is an underwater 360-degree camera configured to capture underwater images of the therapy boot 100. Alternatively, multiple cameras may be used to capture the movements of the user from different perspectives. In such embodiments, the camera 304 may be coupled to a floor or submerged wall of a water tank (e.g., water tank 320), which may be used for rehabilitating the user's foot. Further, in such embodiments, the camera 304 may be enclosed within a water-tight container or a vacuum chamber. The camera 304 sends the captured image and/or video data to the remote computing device 306.

Each of the plurality of markers 302 may be spherical in shape and attached on specific locations on the therapy boot 100 or the user of the therapy boot 100. The plurality of markers 302 are positioned within view of the camera 304 and identifiable from the images received by the remote computing device 306.

The motion analytics system 300 monitors and processes motion data related to foot movement of the user in real-time. For example, the markers 302 can be placed on various locations on the therapy boot 100 and/or the user wearing the therapy boot 100 to provide clear views of the user's movement from various angles. For example, the markers 302 can be located on the legs of the user as well as attached to the shank portion 104, the vamp portion 106, or the heel portion 116. The remote computing device 306 can track the movement of each of the markers 302. In non-limiting examples, the processing of the motion data includes pre-processing, sorting, filtering, compiling, encrypting, decrypting the data as well as computing parameters, statistics, metrics, analytics, etc. using the motion data. Such processing of the motion data may also be performed by the remote computing device 306 or the user computing device 308, preferably with the aid of the remote machine learning processor 307.

In some embodiments, processing of the user's motion data enables a health professional to evaluate whether a user's foot is healing, or whether some portion of the user's foot still requires healing or additional therapy. Based on the sensors on the therapy boot 100, the remote computing device 306 can further analyze inertial movement, weight distribution, and other elements key to physical therapy and rehabilitation of the user's feet.

Figure 3B:
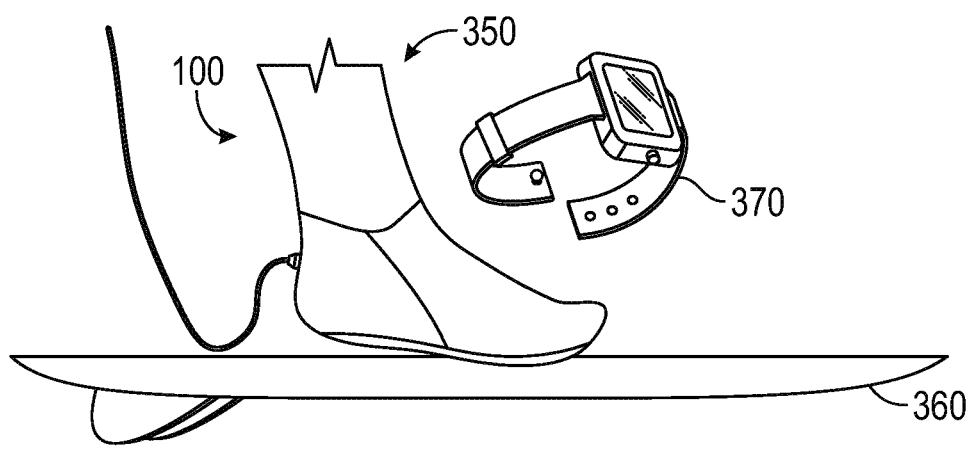
FIG. 3B shows a schematic representation of a second embodiment of a motion analytics system having the therapy boot of FIG. 1, according to certain aspects of the present disclosure.

FIG. 3B shows a schematic representation of a second embodiment of a motion analytics system 350 having the therapy boot 100 used during surfing. In this embodiment, the therapy boot 100 is used for measuring load distribution of the user's legs on a surfboard and gait characteristics. The motion analytics system 350 includes the therapy boot 100, a smartwatch 370 having a software application for the motion analytics and a surfboard 360. The smartwatch 370 includes computing components such as a processor, memory, and a transceiver, and functions substantially similar to the user computing device 308. The smartwatch 370 is synced and paired with the therapy boot 100. The user wears the smartwatch 370 and the therapy boot 100 during surfing. The smartwatch 370 captures data from the sensors in the therapy boot 100 during surfing. The motion data may be stored in the memory device of the smartwatch 370 during a surfing session, and then subsequently wirelessly uploaded to the remote computing device 306. The motion data generated by the sensors on the therapy boot 100 is then analyzed and may be displayed live on the smartwatch 370. This feedback includes three-dimensional force measurements at the interface between the therapy boot 100 and the surfboard 360 and helps the user adjust his or her position on the surfboard 360 during surfing or during subsequent sessions after reviewing the outputs on the smartwatch 370.

FIGS. 4A-4D represent a perspective view, top view, side view, and bottom view, respectively, of the sole portion 114 of the therapy boot 100 (FIG. 1). In some embodiments, the sole portion 114 has low thickness of between about 0.2 mm and about 2 mm. In some embodiments, the sole portion 114 has a shape corresponding to a known shoe size (e.g., 9, 9.5, 10, 10.5, 11, 11.5, etc.). In some embodiments, the sole portion 114 has a shape customized to correspond to a user's foot such that any load sensing areas correspond to pressure points on the foot of the user, for maximum comfort.

The sole portion 114 has a top cover layer 410 and a bottom cover layer 420. The top cover layer 410 and the bottom cover layer 420 is designed to protect a flexible printed circuit board (PCB) 430 disposed between them. In some embodiments, the top cover layer 410 and the bottom cover layer 420 are formed from a waterproof material. The top cover layer 410 has an upper surface 411 and a lower surface 419 (shown in FIG. 5). The bottom cover layer 420 has an upper surface 421 (not shown) and a lower surface 429.

The flexible PCB 430 is made from a glass-reinforced epoxy laminate material such as, but not limited to, FR-4. The flexible PCB 430 is durable enough to withstand weight pressure from user movement and flexible enough to bend as the user's foot bends during movement. The flexible PCB 430 has an upper surface 431, a lower surface 439, a front portion 432, a middle portion 434, and a rear portion 436. A central enclosure 440 for accommodating electronic circuits and devices embedded on the flexible PCB 430 is disposed along the middle portion 434, while a charging socket 433 is disposed along the rear portion 436 of the flexible PCB 430. The flexible PCB 430 further includes a power supply device 438 disposed along the upper surface 431 over the middle portion 434.

In some embodiments, the power supply device 438 may be an ultra-thin rechargeable lithium polymer battery. In other embodiments, the power supply device 438 may include components that allow provision of inductive wireless charging. In yet other embodiments, the power supply device 438 may be charged via kinetic energy harvested by the energy-harvesting sensor 110 (FIG. 1). The lower surface 439 of the flexible PCB 430 may also include a charging socket frame 437 for accommodating a DC charging system that charges the power supply device 438 through the charging socket 433. In some embodiments, the power supply device 438 is configured to have a size that allows integration into the shape of the foot portion 105 of the therapy boot 100 (FIG. 1).

Figure 4A:
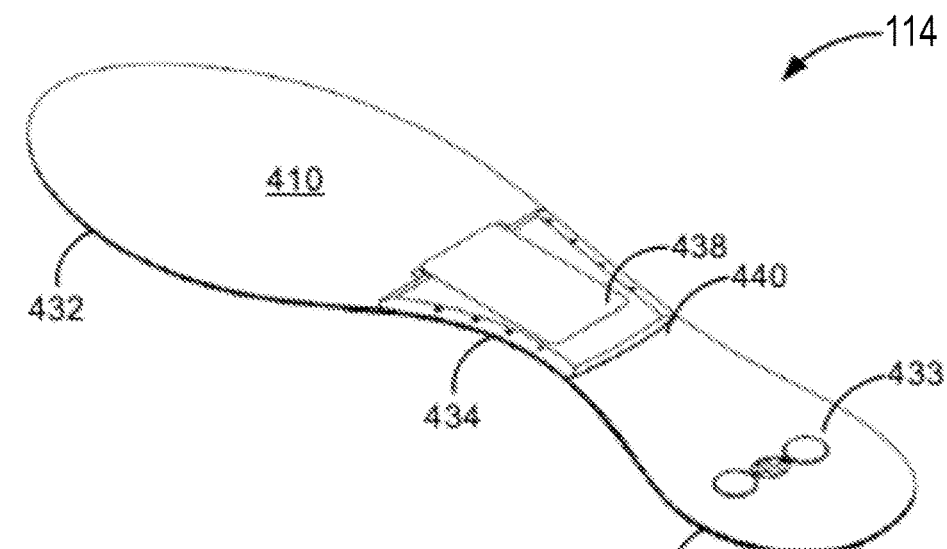
FIG. 4A is a perspective view of the sole portion of the therapy boot of FIG. 1, according to certain aspects of the present disclosure.
Figure 4B:
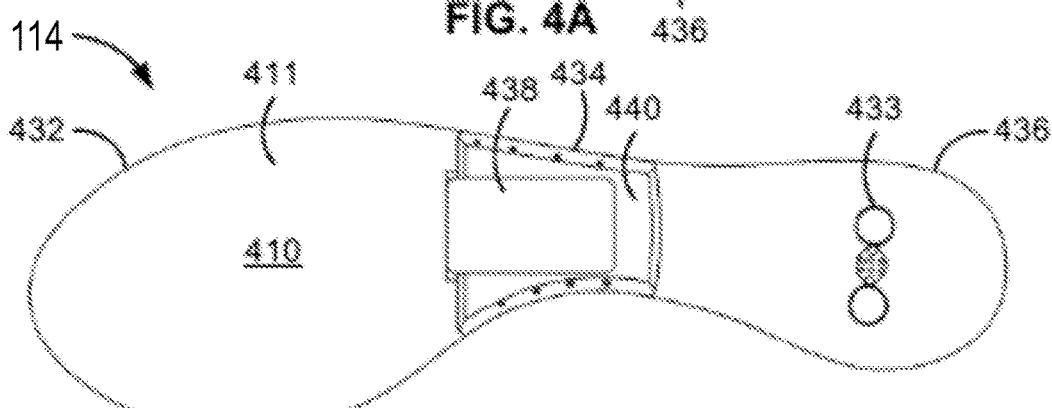
FIG. 4B is a top view of the sole portion of FIG. 4A, according to certain aspects of the present disclosure.
Figure 4C:
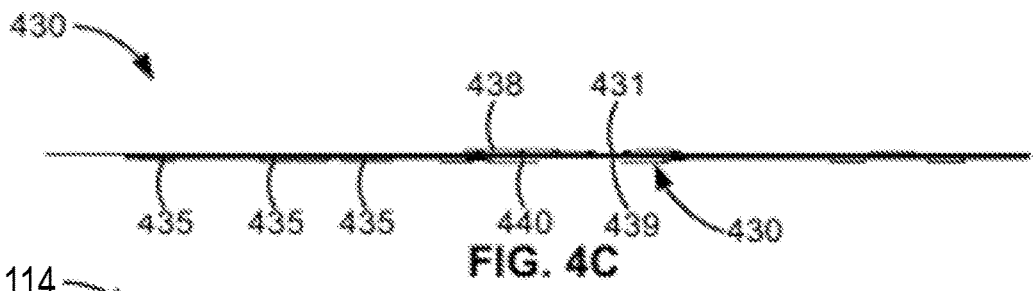
FIG. 4C is a side view of the sole portion of FIG. 4A, according to certain aspects of the present disclosure.
Figure 4D:
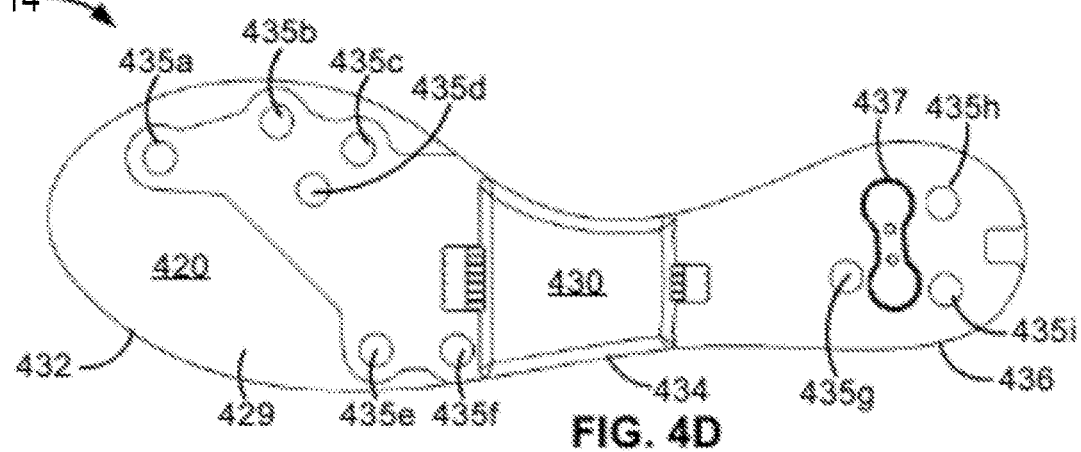
FIG. 4D a bottom view of the sole portion of FIG. 4A, according to certain aspects of the present disclosure.

Multiple sensing areas 435 are distributed adjacent to or along the lower surface 439 of the flexible PCB 430. The sensing areas 435 are each configured to help detect motion and load delivered to and by a user therethrough. The distribution of the sensing areas 435 may be based on commonly known pressure points on a foot or alternatively, customized to correspond with pressure points on the foot of a user based on known physical activity demands of the user. As a non-limiting example, the sensing areas 435 may be grouped in areas that experience the highest load, such as between the first and fifth metatarsal bones and the heel bones. In non-limiting examples, there are nine sensing areas 435a-435i on each sole portion 114 (e.g., as shown in FIG. 4D), but greater or fewer sensing areas may be placed on the sole portion 114. In the non-limiting embodiment of FIG. 4D, the sensing areas 435a is positioned adjacent to the big toe of the foot on the front portion 432; the sensing area 435b-435d are positioned on a medial forefoot section of the inner arch of the foot on the front portion 432; the sensing area 435e is positioned on a medial forefoot section of the outer arch of the foot on the front portion 432; the sensing area 435f is positioned on a lateral forefoot section of the outer arch of the foot on the front portion 432; the sensing area 435g is positioned on a mid-heel section of the foot on the rear portion 436; the sensing area 435h is positioned on a lateral heel section of the foot on the rear portion 436; and the sensing area 435i is positioned on a medial-heel section of the foot on the rear portion 436.

Figure 5:
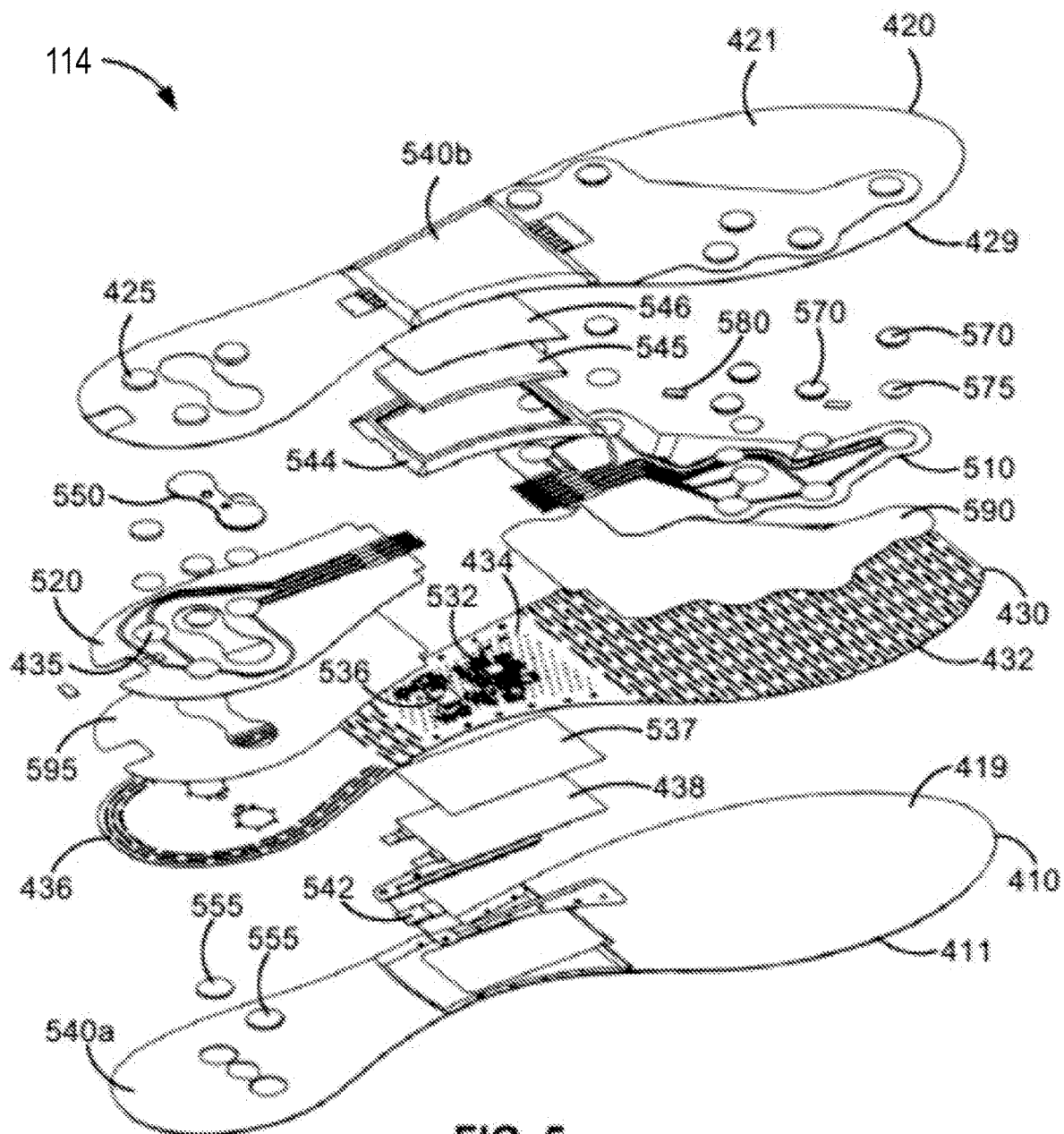
FIG. 5 is an exploded bottom perspective view of the sole portion of FIG. 4A, according to certain aspects of the present disclosure.

FIG. 5 is an exploded bottom perspective view of the sole portion 114. The sole portion 114 has the top cover layer 410 with the upper surface 411 and the lower surface 419. The flexible PCB 430 having the front portion 432, the middle portion 434, and the rear portion 436 is disposed under the top cover layer 410. The flexible PCB 430 also includes a front sensor module 510 and a rear sensor module 520 disposed along the lower surface 439 of the flexible PCB 430 and adjacent to or along the front portion 432 and the rear portion 436 respectively. In this example, the front sensor module 510 includes the sensing areas 435a-435f described above, while the rear sensor module 520 includes the sensing areas 435g-435i described above. The bottom cover layer 420 with the upper surface 421 and the lower surface 429 is disposed under the front sensor module 510 and the rear sensor module 520.

The charging socket frame 437, and an attachment bracket 550 disposed through the charging socket frame 437 are disposed adjacent to the bottom cover layer 420. The attachment bracket 550 is configured to accommodate magnetic attachments 555 of a DC charging station (not shown), and is described in further detail below with respect to FIGS. 9A-9B. The bottom cover layer 420 also includes holes 425 for accommodating each of the plurality of sensing areas 435.

The front sensor module 510 and the rear sensor module 520 are covered by a front adhesive film 590 and a rear adhesive film 595 respectively. The front adhesive film 590 and the rear adhesive film 595 are disposed between the flexible PCB 430 and the bottom cover layer 420. In some embodiments, the front adhesive film 590 and the rear adhesive film 595 may be a slip-resistant layer of ethylene propylene diene monomer (EPDM) foam having thickness between about 0.2 mm and about 1.2 mm. The front sensor module 510 and the rear sensor module 520 are described in further detail with respect to FIGS. 7A-7B.

The front sensor module 510 and the rear sensor module 520 include one or more ventilation openings 710 (FIGS. 7A-7B) for ventilating the sensors therein. Each ventilation opening 710 is covered by a waterproof membrane 580, as further discussed and shown with respect to FIG. 8.

Both the front sensor module 510 and the rear sensor module 520 include multiple sensing areas 435. Each sensing area 435 includes a puck-shaped load concentrator 570 encapsulated within a protective adhesive film 575. The load concentrators 570 have force-sensitive resistors therein that can measure load applied to the location on the foot where the sensing area 435 is located. The load concentrators 570 can have different thicknesses for different areas of the foot. For example, the load concentrators 570 adjacent to the rear portion 436 may have a greater thickness than the load concentrators 570 in the metatarsal area adjacent to the middle portion 434.

The flexible PCB 430 includes a processor 536, the power supply device 438, various sensors for detecting motion of the user, and other electrical components. These sensors include the force-sensitive resistors that change resistance upon application of a force, an inertial sensor for measuring translational and rotational motion of the foot, a temperature sensor for measuring temperature of the foot, a heart rate sensor for measuring heart rate, three-axis accelerometers for measuring acceleration and g-forces, three-axis gyroscopes for measuring rotation and angular velocity, magnetometers for measuring trajectory and direction of heading, an electromyography sensor for measuring muscle activation and fatigue, or any combination thereof. In some embodiments, the three-axis accelerometers include at least one high-G accelerometer. The distribution of sensing points for the force-sensitive resistors may be based on commonly known pressure points on feet or alternatively, customized to correspond with pressure points on the foot of a user based on known physical activity demands of the user. For example, the force-sensitive resistors may have sensing points directly under the heel of the user in the rear portion 436 in order to capture data on translational and rotational motion from an area which experiences a high range of motion. In some embodiments, the force-sensitive resistors are replaceable devices that can be installed after peeling off a sensor cover.

In some embodiments, the force-sensitive resistors have a measuring frequency of about 300 Hz, sensitivity of about 1 Newton, and accuracy of about ±3 Newtons. In some embodiments, the force-sensitive resistors can have a measuring frequency of up to about 1200 Hz. In some embodiments, the three-axis accelerometers have a measuring frequency of between about 300-1200 Hz, a range between about ±2-16 G, and a sensitivity of about 0.06-0.48 mG. In some embodiments, the high-G accelerometers have a measuring frequency of between about 300-1200 Hz, a range between about ±100-400 G, and a sensitivity of about 49-195 mG. In some embodiments, the three-axis gyroscopes have a measuring frequency of between about 300-1200 Hz, a range between about ±200-2000 dps, and a sensitivity of about 7.6-61 mdps. In some embodiments, the magnetometers have a measuring frequency of between about 100-400 Hz, a range between about ±4900 uT, and a sensitivity of about 0.15 uT. In some embodiments, the temperature sensor measures temperature at frequency of 1 Hz with a sensitivity of about 1 Celsius.

Figure 6A:
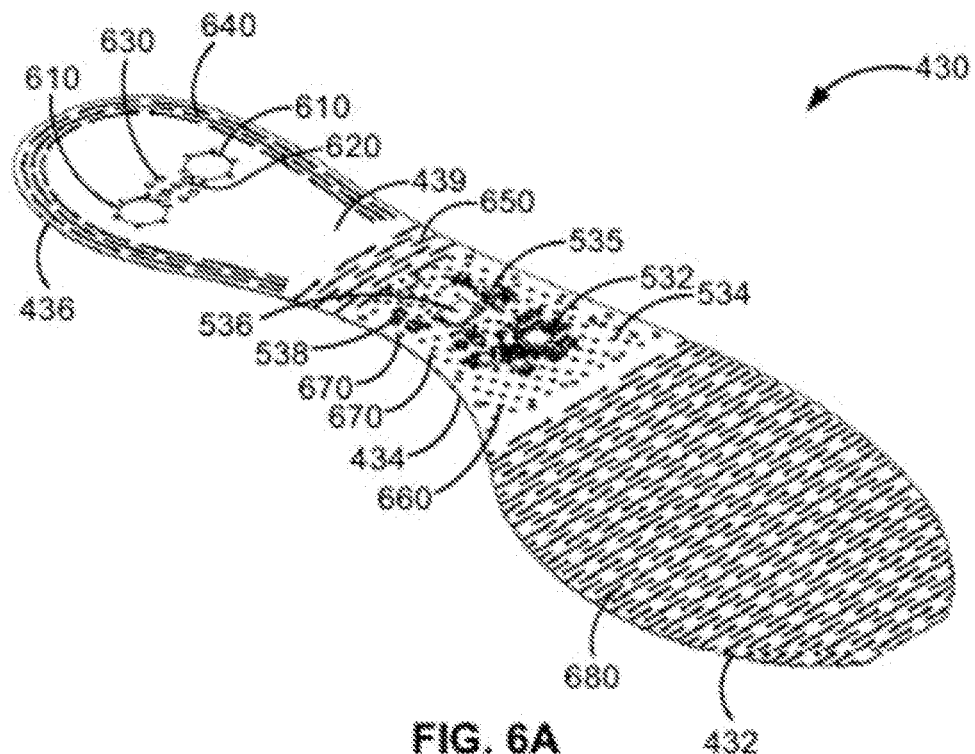
FIG. 6A is a bottom perspective view of a flexible printed circuit board disposed within the sole portion of FIG. 4A, according to certain aspects of the present disclosure.
Figure 6B:
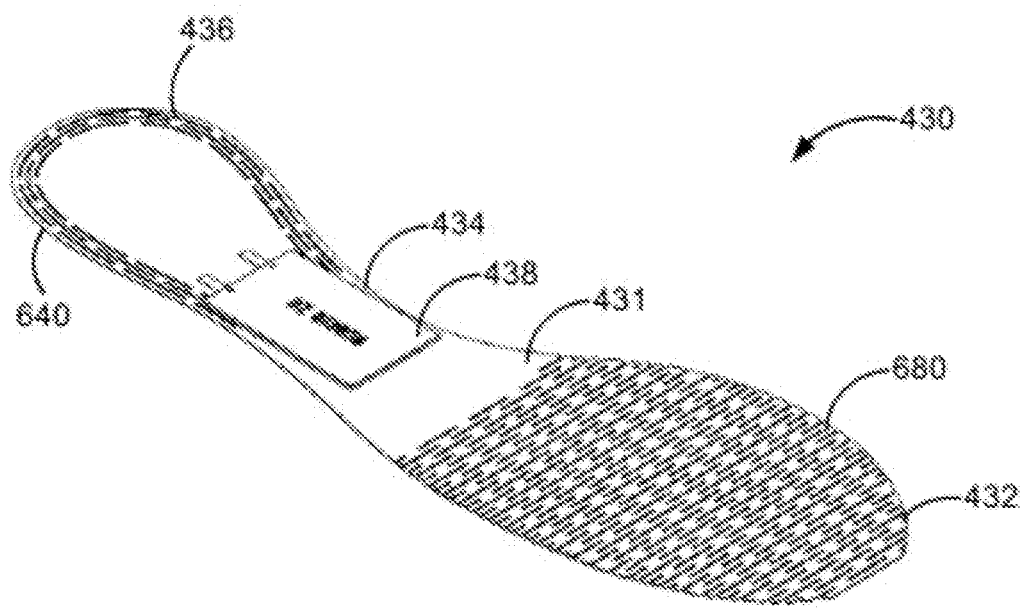
FIG. 6B is a top perspective view of the flexible printed circuit board of FIG. 6A disposed within the sole portion of FIG. 4A, according to certain aspects of the present disclosure.

The processor 536 is substantially similar to the processor in the remote computing device 306 described above. The processor 536 is configured to receive motion data generated by the sensors in the sole portion 114. The processor 536 may be any device capable of executing a machine-readable instruction set stored in an associated memory device 535 (FIG. 6A). The processor 536 may be an electronic controller, an integrated circuit, CPLD, an FPGA, an ASIC, a microcontroller, a programmable chip device, a computer, or any other computing device. In a non-limiting example, the processor 536 is a microcontroller having built-in wireless capabilities.

The power supply device 438 is electrically coupled to the sensors in the sole portion 114 and the processor 536. The power supply device 438 is encapsulated within an adhesive film 537 for protection. The power supply device 438 is configured to power the sensors in the sole portion 114, the processor 536, and any electrical and electronic devices embedded in the flexible PCB 430.

The central enclosure 440 is disposed along the middle portion 434 of the flexible PCB 430 for housing the sensors, the power supply device 438, the processor 536, and other electronic circuits and devices. The central enclosure 440 has an upper frame 542, a lower frame 544, and a covering plate 546 coupled to the lower frame 544. The upper frame 542 and the lower frame 544 are covered with a protective fabric 540a and a protective fabric 540b respectively. A layer of potting material 545 such as, but not limited to, epoxy resin is disposed within the lower frame 544 and between the covering plate 546 and the flexible PCB 430.

FIGS. 6A-6D represent a bottom perspective view, a top perspective view, a bottom view, and a side view, respectively, of the flexible PCB 430 disposed within the sole portion 114. While various features and embodiments of the flexible PCB 430 are already discussed above, FIGS. 6A-6D provide additional features and perspectives of the flexible PCB 430. The power supply device 438 is disposed adjacent to or along the upper surface 431 in the middle portion 434 of the flexible PCB 430, while the charging socket 433 is disposed on the upper surface 431 in the rear portion 436 of the flexible PCB 430. The charging socket 433 is configured to charge the power supply device 438 by DC charging. The sensing areas 435a-435i are distributed on the lower surface 439 of the flexible PCB 430 based on pressure points on the foot of a user, as shown in FIGS. 6C-6D.

The central enclosure 440 (shown in FIGS. 4A-4D, and FIG. 6D) is disposed adjacent to or along the lower surface 439 in the middle portion 434 of the flexible PCB 430. The central enclosure 440 houses the sensors, the processor 536, the memory device 535, a router device 534, and an energy-harvesting device 538. The energy-harvesting device 538 is configured to convert the kinetic energy generated through movement of the sole portion 114 into electrical energy for charging the power supply device 438.

The memory device 535 is a non-transitory processor-readable memory device that is substantially similar to the memory device in the remote computing device 306. In the non-limiting example of FIGS. 4A-6D, the memory device 535 is a flash NAND memory device having at least 128 MB of storage. The memory device 535 stores machine-readable instructions that when executed by the processor 536 causes the processor 536 to encrypt the motion data generated from the sensors in the sole portion 114 using an Advanced Encryption Standard (AES), and then upload the encrypted data to the remote computing device 306 and/or the user computing device 308. Additionally, the machine-readable instructions may cause the processor 536 to download data from the remote computing device 306 and/or the user computing device 308 and decrypt the downloaded data.

The motion data may be used by the processor 536, the remote computing device 306, and/or the user computing device 308 to present interactive visualizations on the motion of the user and/or provide predictive feedback on the motion of the feet of the user, determined by a supervised or an unsupervised algorithm based on the motion data. Further, the sole portion 114 can be diagnosed remotely from the remote computing device 306 and/or the user computing device 308 using diagnostic data uploaded and downloaded over the wireless communication channels described above.

The router device 534 may include an antenna, a modem, a LAN port, wireless fidelity (Wi-Fi®) card, WiMax card, ZigBee® card, Bluetooth® chip, USB card, mobile communications hardware, and/or other hardware for communicating with other networks and/or devices. The router device 534 enables wireless internet communication between the sole portion 114 and an external device such as the remote computing device 306, the user computing device 308, a compression vest, a wearable device worn by the user such as those made by Apple®, Garmin®, FitBit®, etc. In the non-limiting example of FIGS. 4A-6D, the router device 534 is a 4G/5G IoT (Internet-of-things) modem, which provides low-power operation in an always-connected state (at less than 2 milli amperes of current) and can provide encrypted data uploads many times per day. When the sole portion 114 is operational in remote locations where there is no cellular signal, the motion data can be uploaded using a local Bluetooth® network, or may be stored in the memory device 535 until better wireless connection is available.

Additionally, the central enclosure 440 of the flexible PCB 430 may include supporting electronic devices and circuits such as, but not limited to, a charger for recharging the power supply device 438, a DC/DC switching regulator for converting DC power of the power supply device 438 to system power, a transimpedance amplifier (not shown), a multiplexer (not shown), one or more voltage regulators, a radio-frequency (RF) antenna, a battery protector, a supervisor for the processor 536, and the like.

The flexible PCB 430 further includes a number of physical features. These include one or more cutout portions 610 to accommodate the one or more magnetic attachments 555 of a DC charging station (not shown), one or more conductive surfaces/traces 630 for spring-loaded connection pins of the DC charging station, one or more holes 620 to accommodate guide pins of the DC charging station, a cluster of perforations 660 in the middle portion 434 for incorporating the layer of potting material 545, and a series of apertures 670 around a perimeter of the middle portion 434 for positioning the central enclosure 440. Further, the flexible PCB 430 includes kerf bend cuts 640 forming a concave shape around the rear portion 436 of the flexible PCB 430, which results in high transverse flexibility perpendicular to the concave contour; kerf bend cuts 650 for separating the central enclosure 440 from the rear portion 436, which results in high longitudinal flexibility; and kerf bend cuts 680 for enabling longitudinal bending of the front portion 432 of the flexible PCB 430, which results in very high longitudinal and medium transverse flexibility. The kerf bend cuts 640, 650, and 680 allow the FR-4 material of the flexible PCB 430 to be used as a current carrier through the incessant translational, rotational, and shearing movement of the sole portion 114. Additionally, the kerf bend cuts 640, 650, and 680 allow the sole portion 114 to take the shape of the footwear it is placed in, which creates tighter fitting and more precise measurement of motion by the sensors.

FIG. 6D shows a cross-sectional view of the sole portion 114 along the line 6D-6D' in FIG. 6C, showing the various layers of the middle portion 434 stacked over one another from the bottom to the top. FIG. 6D shows an inset I showing the specific layers of the middle portion 434. The covering plate 546 is stacked under the layer of potting material 545, which is stacked under the lower frame 544. The lower frame 544 is stacked under the flexible PCB 430, which is stacked under the power supply device 438, which is stacked under the upper frame 542.

Figure 7A:
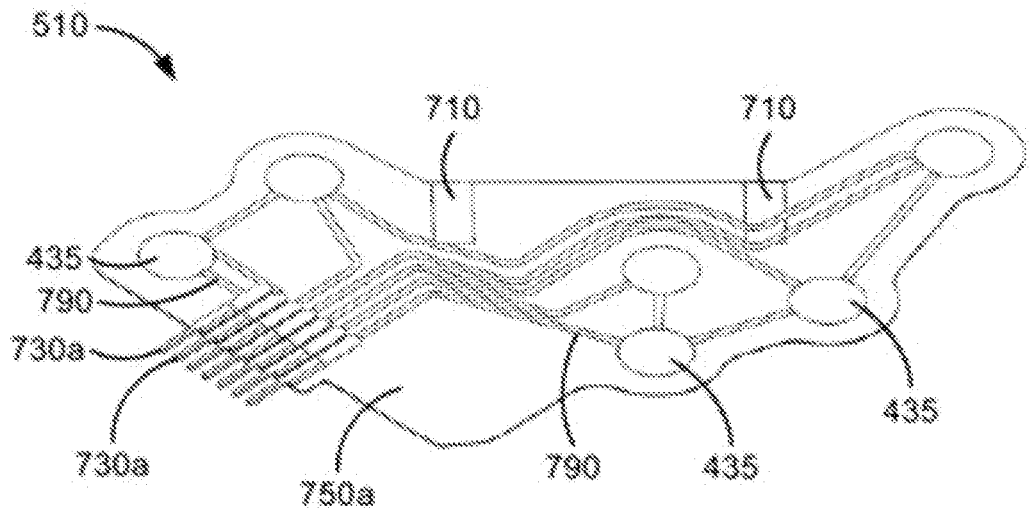
FIG. 7A is a bottom perspective view showing a front sensor module of the flexible printed circuit board of FIG. 6A, according to certain aspects of the present disclosure.

FIG. 7A is a bottom perspective view showing the front sensor module 510 of the flexible PCB 430. The front sensor module 510 includes one or more sensing areas 435, connection pins 730a, traces 790 connecting the sensing areas 435 with the connection pins 730a, and one or more ventilation openings 710 that provide ventilation to the sensors of the flexible PCB 430. The connection pins 730a are configure to connect with the central enclosure 440 (FIGS. 4A-4D and FIG. 5). The sensing areas 435 and the ventilation openings 710 are dispersed on a film laminate 750a that protects the flexible PCB 430 against tearing.

Figure 7B:
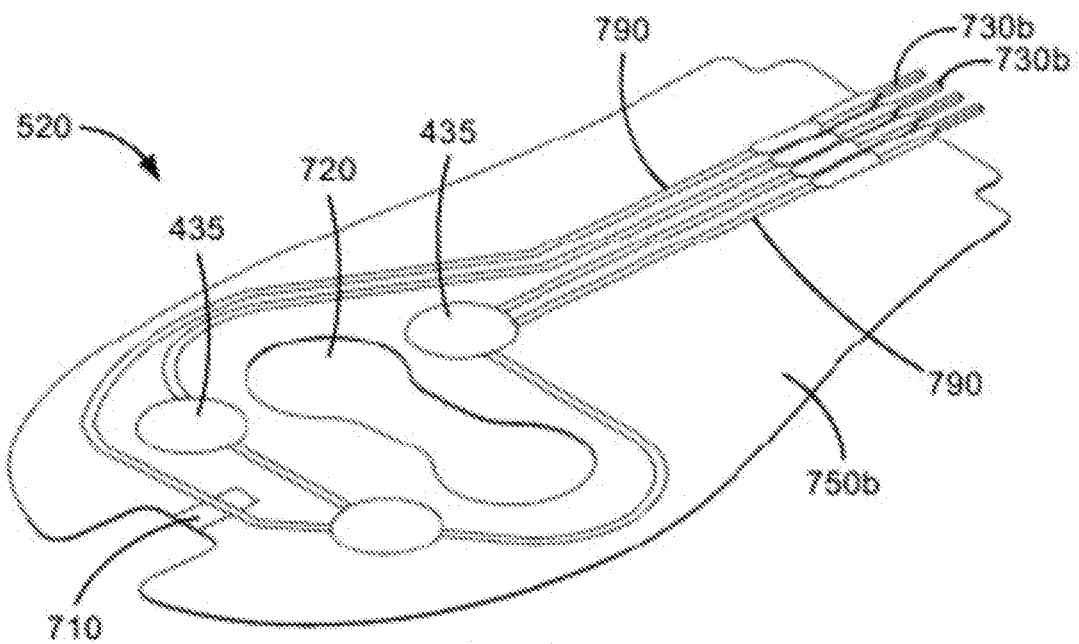
FIG. 7B is a bottom perspective view showing a rear sensor module of the flexible printed circuit board of FIG. 6A, according to certain aspects of the present disclosure.

FIG. 7B is a bottom perspective view showing the rear sensor module 520 of the flexible PCB 430. The rear sensor module 520 includes one or more sensing areas 435, connection pins 730b, traces 790 connecting the sensing areas 435 with the connection pins 730b, one or more ventilation openings 710 and a cutout 720 for the attachment bracket 550 of the bottom cover layer 420. The connection pins 730b are configured to connect with the central enclosure 440. The sensing areas 435 and the ventilation openings 710 are dispersed on a film laminate 750b that protects the flexible PCB 430 against tearing.

Figure 8:
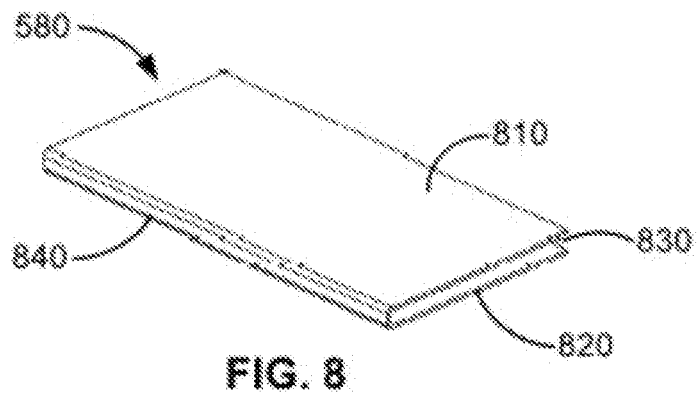
FIG. 8 is perspective view of a waterproof membrane for covering ventilation openings in the front sensor module of FIG. 7A and the rear sensor module of FIG. 7B, according to certain aspects of the present disclosure.

FIG. 8 is perspective view of one of the waterproof membranes 580 in FIG. 5. The waterproof membrane 580 covers one of the ventilation openings 710 in the front sensor module 510 and the rear sensor module 520. Each waterproof membrane 580 includes an open area 830 surrounded by an upper wall 810, a lower wall 820, and a sidewall 840. The open area 830 is placed over one of the ventilation openings 710 in the front sensor module 510 and the rear sensor module 520.

Figures 9A, 9B:
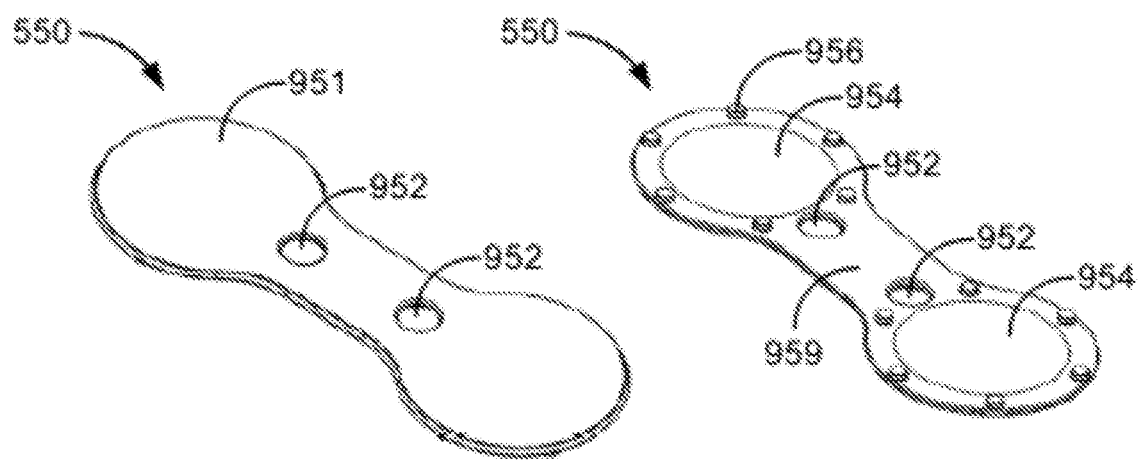
FIG. 9A is a top perspective view showing an attachment bracket of a charging socket of the sole portion of FIG. 4A, according to certain aspects of the present disclosure.
FIG. 9B is a bottom perspective view showing the attachment bracket of FIG. 9A, according to certain aspects of the present disclosure.

FIGS. 9A-9B represent a top perspective view and a bottom perspective view, respectively, showing the attachment bracket 550 on the bottom cover layer 420. The attachment bracket 550 has a top surface 951 and a bottom surface 959. A number of pins 956 are dispersed around a perimeter of the bottom surface 959. The pins 956 aid in positioning and locking the attachment bracket 550 to the bottom cover layer 420. The attachment bracket 550 further includes one or more cutouts 954 for placing the magnetic attachments 555 of a DC charging station (not shown) and one or more through-holes 952 to accommodate guide pins of the DC charging station.

Figures 10A, 10B:
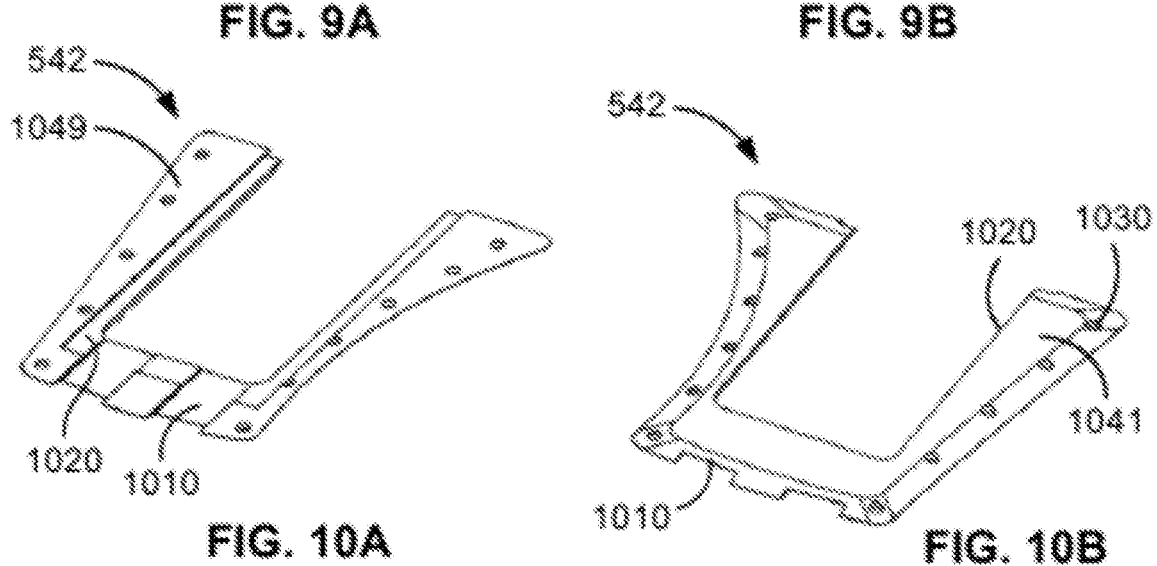
FIG. 10A is a bottom perspective view showing an upper frame of a central enclosure for housing electronics embedded in the flexible printed circuit board of FIG. 6A, according to certain aspects of the present disclosure.
FIG. 10B is a top perspective view showing the upper frame of FIG. 10A, according to certain aspects of the present disclosure.

FIGS. 10A-10B represent a bottom perspective view and a top perspective view, respectively, showing the upper frame 542 of the central enclosure 440 that covers the power supply device 438. The upper frame 542 has a top surface 1041 and a bottom surface 1049. The upper frame 542 includes one or more cut-outs 1010 for terminals of the power supply device 438, as well as a support edge 1020 to accommodate a thinner section of the power supply device 438. The upper frame 542 further includes a number of pins 1030 dispersed around a perimeter of the bottom surface 1049, which aid in positioning the upper frame 542 with the lower frame 544 and connecting with the flexible PCB 430.

Figures 10C, 10D:
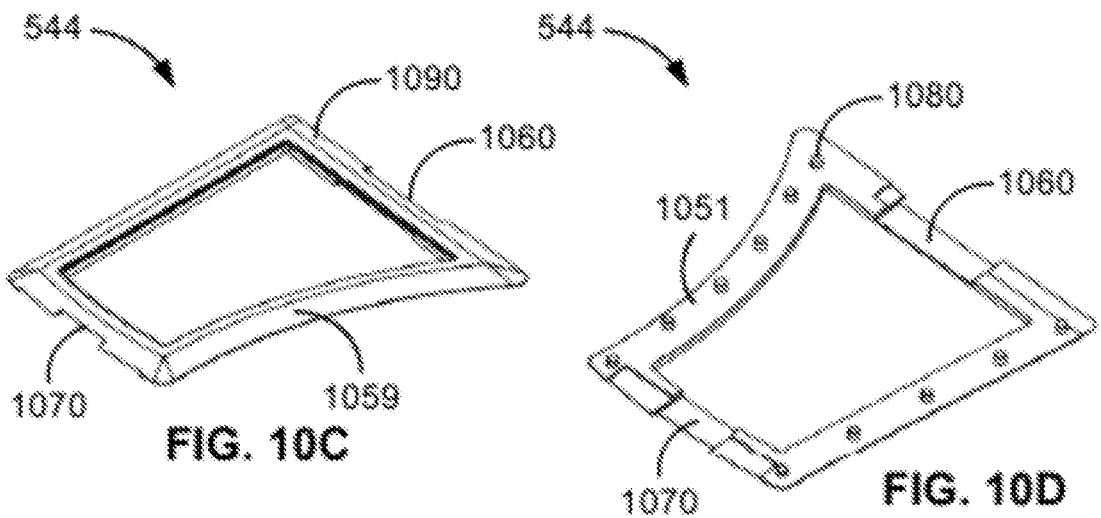
FIG. 10C is a bottom perspective view showing a lower frame of a central enclosure for housing electronics embedded in the flexible printed circuit board of FIG. 6A, according to certain aspects of the present disclosure.
FIG. 10D is a top perspective view showing the lower frame of FIG. 10C, according to certain aspects of the present disclosure.

FIGS. 10C-10D represent a bottom perspective view and a top perspective view, respectively, showing the lower frame 544 of the central enclosure 440 that covers the electronic circuits and devices therein. The lower frame 544 has a top surface 1051 and a bottom surface 1059. The lower frame 544 includes one or more cut-outs 1060 for connection pins 730a of the front sensor module 510, one or more cut-outs 1070 for connection pins 730b of the rear sensor module 520, and a cut-out 1090 for pouring in potting material to form the layer of potting material 545. The lower frame 544 further includes a number of pins 1080 dispersed around a perimeter of the top surface 1051, which aid in positioning the lower frame 544 with the upper frame 542 and connecting with the flexible PCB 430.

As mentioned above, in different embodiments, the user may be an animal such a horse, a camel, other racing animals, or other highly active animals. The shape of the therapy boot is designed accordingly. FIGS. 11A-11B-11C show a side perspective view, a front perspective view, and a rear perspective view, respectively, of an example therapy boot 1100 for a horse's hoof. The therapy boot 1100 has a sole portion 1120, a foot portion 1130, and a shank portion 1140, and may or may not be used with a horse shoe. In some embodiments, the sole portion 1120, the foot portion 1130, and the shank portion 1140 may be separate pieces coupled to each other, while in others, the sole portion 1120, the foot portion 1130, and the shank portion 1140 may form a single integrated piece. An asymmetric zipper 1150 runs down from the shank portion 1140 across the foot portion 1130 and to the sole portion 1120. The asymmetric zipper 1150 enables easy access for the horse's hoof into the therapy boot 1100.

In the therapy boot 1100 embodiment shown in FIGS. 11A-11B-11C, the sole portion 1120, the foot portion 1130, and the shank portion 1140 have an exterior surface made from neoprene and an interior surface made from Kevlar®. In some embodiments, any or all of the sole portion 1120, the foot portion 1130, and the shank portion 1140 may be formed from a waterproof material.

The sole portion 1120 includes an internal comfort pad (not shown) that conforms in shape with the horse's hoof and provides additional support thereto. The sole portion 1120 is substantially similar in structure and function to the sole portion 114 of the therapy boot 100. Accordingly, the sole portion 1120 includes a power supply device, an electronic control module, a plurality of sensors embedded on and electronically coupled to a printed circuit board, among other electronics, similar to as described above for the sole portion 114 of the therapy boot 100. In some embodiments, a supporting base layer 1110 is disposed under the sole portion 1120. In some embodiments, the supporting base layer 1110 conforms in shape to the sole portion 1120. The supporting base layer 1110 has a grooved structure that provides support and extra grip, as well as spreads the load on the horse's hoof across the sole portion 1120.

Overall, the therapy boot 1100 can be used with current underwater treadmills, which is a mechanism to enhance suppleness, stride length, increase cardiovascular fitness, and help build muscle tone, core strength, and overall wellbeing for horses. For example, underwater treadmills are often used for horses recovering from joint surgery or suffering from injuries to tendon and ligaments. Controlled underwater movement helps rehabilitate such injuries through a gradual transition back into recovery of normal range of motion. This is achieved through cooling the temperature of the area being treated as well as using the buoyant and resistive forces of water to strengthen and massage concerned muscle groups. Further, when the therapy boot 1100 is used, additional loads can be added on the horse's feet, but the amount of weight experienced by the horse can be lessened by using the inflatable air sleeve 220 (FIG. 2C). This helps move the concerned muscle groups to work against the resistance of the water in a controlled exercise regime for healing and rehabilitation. Accordingly, the horse wearing the therapy boot 1100 while using an underwater treadmill receives a highly effective full body workout, which improves general fitness, rehabilitation, joint flexion and respiration. As explained above, motion data may be collected from such workouts for data analysis to further enhance the effectiveness of therapy and rehabilitation.

The systems and methods of monitoring foot performance using the therapy boot 100 as described herein can be configured to provide time-stamped prescriptive and augmented analytics of the motion data generated from the therapy boot 100, the sole portion 114, and any wearable device connected to them.

The motion data is analyzed to determine three categories of metrics—load, force distribution, and gait using a load module, a force distribution module, and a gait module respectively in software executed by the processor of the remote computing device 306. The load module calculates the force imparted to each sole portion 114 during each session. Using a threshold-based algorithm and using both the force-sensitive resistor and inertial sensors described above, the load module determines both the initial contact (IC) and final contact (FC) points of the foot with the ground during the gait cycle.

The force-sensitive resistors capture raw pressure data from each of the force-measuring sensors in the sensing areas 435a-435i and transforms it into force data, via a force calibration algorithm. The force calibration algorithm approximates the ground reaction force during a gait from the motion data generated by the sole portion. The force calibration algorithm is trained by data captured from a variety of subjects and forms of footwear under a variety of stepping conditions using a piezo-electric force plate to output a ground reaction force value.

The inertial sensors add more granularity to high-impact forces experienced by the user during initial contact with the ground during running and jumping motions. The load module uses both IC and FC points to provide temporal boundaries for subsequent calculations. The load metrics are determined through the output of the force calibration algorithm and analyzed by a subject matter expert, which provides the user with mechanical load data from the interaction of the foot with the ground. For example, the mechanical load data includes time series of contact forces and frictional forces experienced by the user's foot.

As a non-limiting example, load data is obtained following a training or rehabilitation session. Load data maybe collected hourly or daily, and used to calculate weekly, monthly and season load totals. This is termed "longitudinal load monitoring." Users may be monitored consistently via the sensors on the therapy boot 100, 1100, with special attention made to those who are recovering from injury, or have recently recovered from injury. Cumulative load 'budgets' are utilized to control the amount of load each user is subjected to during training and competing, over a given period of time. When users are at risk of exceeding their load "budget" due to a training session exhibiting more load than planned/expected, subsequent training sessions can be modified in order to keep the user within their 'budget' and thereby mitigate the risk of injury.

The force distribution module uses calibrated force data to calculate the force differences between left and right foot, as well as the differences between the various regions of each foot. The force-measuring sensors 435a-435i in the sole portion 114 capture data from the most relevant regions of the foot, providing insight into the loading pattern experienced by the user during the gait cycle. The regions of the foot are separated into rearfoot (heel), midfoot (middle) and forefoot (toward toes) to simplify insight and facilitate understanding. The characteristics of regional load distribution are presented to the user in simple terms to provide an objective measure of symmetry between left and right sides, as well as regions of each foot. The symmetry calculation is based on either force or impulse. One example of a symmetry calculation is a ratio between a difference and a sum of the measurements of the left foot and the right foot.

As a non-limiting example, force distribution data is obtained following a training or rehabilitation session. The data provides insight into the symmetry of movement of each user throughout the session (i.e., the difference in load taken through the left and right foot). Symmetry data is collated longitudinally, allowing comparison between the data from a single training session and a user's 'symmetry average' over a period of time. When a particular user is found to have exhibited a symmetry measurement from a session that differs significantly from their "symmetry average", the user can be screened by medical staff to detect whether a new injury, or functional deficit, may be responsible for the change in symmetry. In this way, "at risk" users can be screened following the session, facilitating the application of corrective exercises or manual treatment, thereby mitigating the risk of injury resulting from subsequent sessions.

The gait module uses both IC/FC points and calibrated force/impulse data to calculate metrics that provide more detailed insight into the gait strategy used by each user. This is higher-level information designed for use by the user or an experienced coach looking to understand the unique movements involved during the gait cycle, determine normal gait patterns for a given footwear/ground interface, diagnose issues causing pain, and implement effective corrective exercise or treatment to correct abnormalities. Gait metrics can be separated into temporal, spatial, kinetic and kinematic categories.

The gait module includes temporal metrics (based on time) that include, but are not limited to, contact time (time in which one foot is in contact with the ground), flight time (time in which neither foot is in contact with the ground during running), dual-support time (time in which both feet are in contact with the ground during walking), swing time (duration of the swing phase of the gait cycle), and duty factor (the ratio of contact time to the sum of contact and flight times, which is a measure of efficiency). Other temporal gait metrics include step frequency (number of steps per second or minute) and stride frequency (numbers of complete strides per second or minute).

Spatial gait metrics include, but are not limited to, step length (distance covered during one step) and stride length (distance covered during one stride). Both of these metrics involve a calculation of speed which may be derived by a supervised machine learning process involving motion data captured by both the force-sensitive resistors and the inertial sensors described above.

Kinetic gait metrics include peak and average forces in either the vertical, frontal or lateral plane, as well as representation of force angle and gait line (the path of force throughout the foot), derived from the force calibration algorithm previously discussed.

Kinematic gait metrics include distance covered, movement speed, swing leg velocity, acceleration, and are all dependent on the modelling of speed from the sensor data.

As a non-limiting example, gait data is obtained from a user wearing the therapy boot 100 following a rehabilitation or training session. The rehabilitation process can be informed in detail by utilizing gait metrics to understand the strategies employed by the user to execute a movement task. For example, stress received by a muscle can be monitored during a particular session while performing the movement task. Throughout the rehabilitation period, following long-term injury or surgery, gait metrics can be used by the experienced coach to guide the progression of exercises applicable to the user. By comparing the gait metrics collected during a task that is performed post-injury with "baseline" gait metrics collected when performing the same task pre-injury, the coach is provided a means to assess the user's readiness for the task. In this example, use of gait data by a skilled coach, can significantly increase the likelihood of a successful rehabilitation period, enabling the user to safely return to normal movements.

The prescriptive and augmented analytics may be viewed as interactive visualizations on a software application interface on the display of the user computing device 308. The software application may be used before, during, or after a session for a single user, or group of users. The software application is also used to mark one or more periods within a session, providing a means for the user to separate a session into meaningful portions and/or determine analytics based on any combination of the sensors, thereby enriching the insights available following analysis and the interactive visualizations based on the motion data. The software application may be used to capture and record video data corresponding to one or more periods of the session during which motion data is collected to facilitate a greater understanding of the motion data over time. The software application can also be used to switch collection of motion data between a "live" mode for livestreaming the motion data captured by the sensors during a session, and a "recall" mode for viewing recorded motion data associated with one or more periods of the session, which may be user-selected. This provides the user with information in real-time during a session and after a session, which generate insights into the "activity load", performance, and risk of injury. Further, the software application may provide the ability to overlay forces on images of the left foot and the right foot on a time base from the captured recording or livestream, visualize the data in different areas of the foot—sum the individual loads on the heel area, the lateral area, the medial area and the forefoot area on each sole portion 114, or sum each of the entire sole portions 114 on the left foot and the right foot, as well as related analytics such as average force, peak force, cumulative force, percent symmetry between left foot and right foot, contact time, flight time, etc.

The interactive visualizations can occur both in real-time as well as a recorded feed after a session has been completed. In some embodiments, the interactive visualizations include motion graphics with force-time series data streamlined in real time. In some embodiments, the analytics may include average force, peak force, cumulative force, force-frequency profile, muscle activation level, contact time, etc. for different areas of each foot and leg, as selected by the user. Further, the analytics may include interplay between the different legs and feet such as, but not limited to, percent loading symmetry between left foot and right foot.

Individual motion data sets from each of the sensors and wearable devices described above may be viewed separately or cumulatively, and combined with a video recording of the motion to gain in-depth insight into the movement of the user. An indication may be delivered when there is a threshold percentage change from base line values that suggest overloading or if overloading is being avoided.

Figure 12:
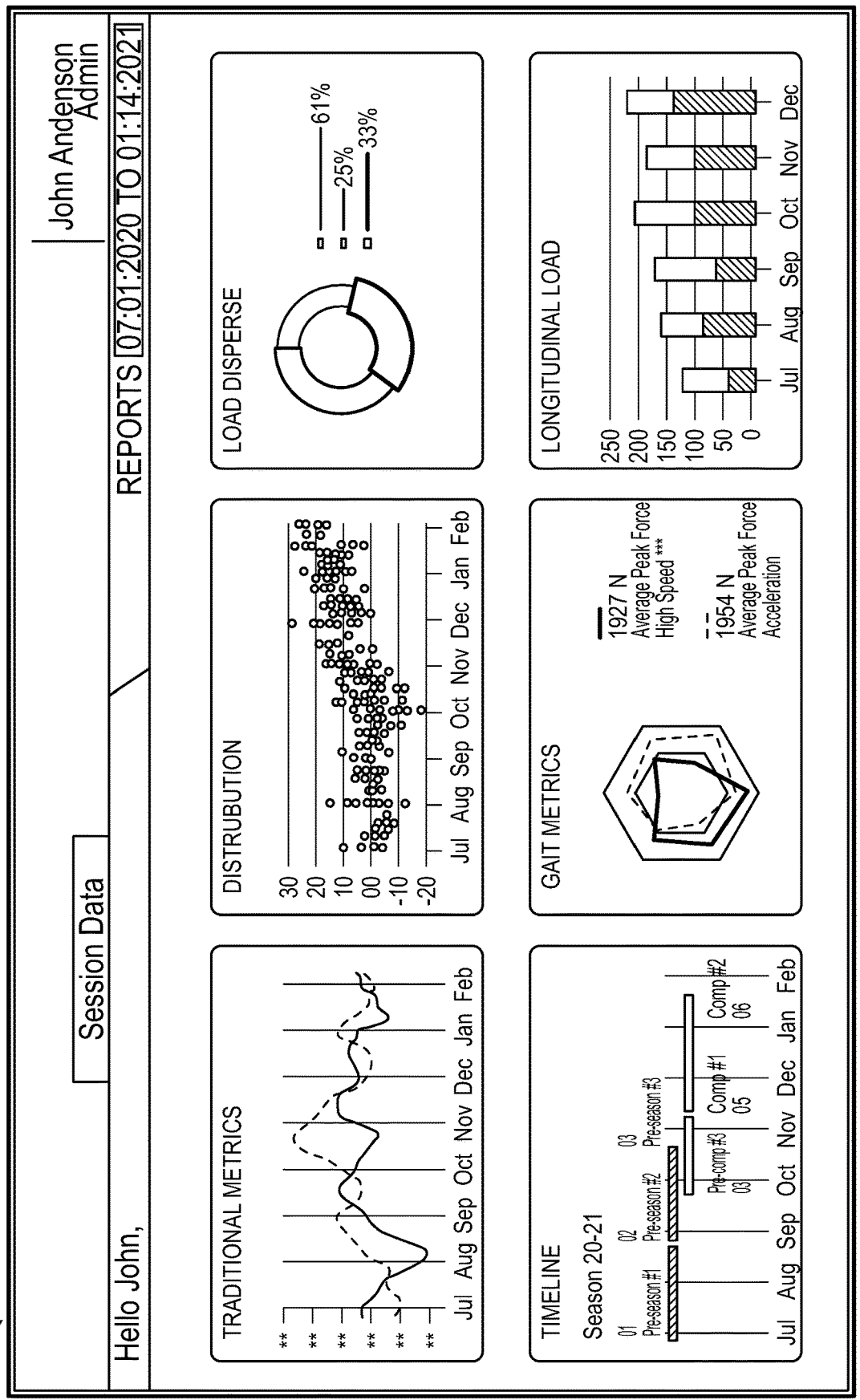
FIG. 12 shows an interactive visualization related to motion of a user of the therapy boot of FIG. 1 on an example embodiment of a software application interface, according to certain aspects of the present disclosure.

FIG. 12 shows a non-limiting example of an interactive visualization 1200 related to motion of a user of the therapy boot 100 on an example embodiment of a software application interface. The data in the visualization 1200 may be collected from the sole portion 114. The interactive visualization 1200 presents a number of selectable analytical insights. The insights may include such as traditional metrics, load distribution on a foot over sessions over a period of time (e.g., six months), load dispersal, timeline of sessions from which data was collected, metrics of gait features like peak force, and longitudinal load experienced by the user. Any one of the analytical insights can be selected and then viewed for individual sessions, teams, user, and the like. One or more of these analytical insights may be derived from the motion data of the user using one or more machine learning algorithms explained above.

Figure 13:
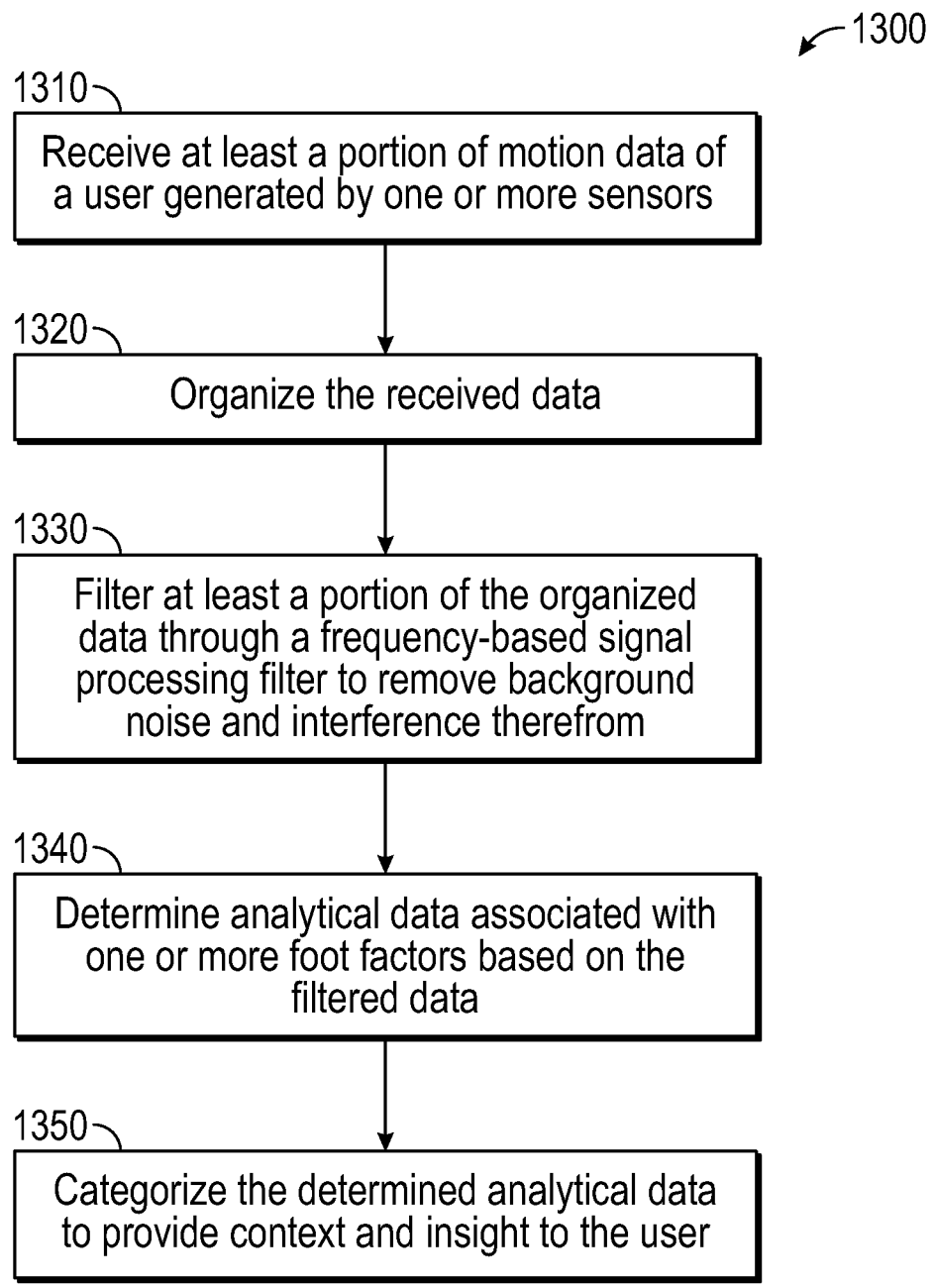
FIG. 13 shows a block diagram of a data analytics method performed by a motion analytics system having the therapy boot of FIG. 1, according to certain aspects of the present disclosure.

FIG. 13 shows a block diagram of a data analytics method 1300 performed by the motion analytics systems 300, 350 using motion data generated from the sensors in the therapy boot 100. The sensors may include force-sensitive resistors that measure loading at different pressure points on the foot, three-axis accelerometers that measure translational motion of the foot, gyroscopes that measure rotational motion of the foot, magnetometers that measure change of direction during movement of the foot, temperature sensors for measuring heat-generated due to movement of the foot, electromyography sensors that measure muscle activation and fatigue, and heart sensors that measure and monitor heart health parameters of the user.

The method 1300 begins in block 1310, where at least a portion of the motion data of the user generated by the sensors, is received. The motion data may be received by a processor within the therapy boot, the sole portion, an external computing device, a user computing device, and any device that is capable of further processing and analyzing the motion data.

In block 1320, the received data is organized. In some embodiments, the process of organizing the received data may include assigning user characteristics to the received motion data. The user characteristics may include information about the user such as, but not limited to, age, gender, location, nationality, shoe size, height, weight, surface of interaction of the user's feet, nutritional facts about the user, past injuries, physiological parameters such as heart rate and blood pressure, etc. This data may be collected by a user via an interface presented to the user on a user computing device.

In some embodiments, the process of organizing the received data may include segmenting one or more portions of the received data based on one or more user-defined time-stamped sessions. As an example, the received data can be divided into data acquired during a training session, clinic session, activity session, etc., where each session has a designated time period.

In some embodiments, the process of organizing the received data may further include validating the received motion data through removal of erroneous and missing data, thereby ensuring data integrity. The erroneous and missing data could be due to a dysfunctional sensor, improper capture of data, inaccurate transmission of captured data. Accordingly, it is important to purge erroneous and missing data points from received data to ensure data integrity. The erroneous and missing data may then be interpolated into the validated data to form a consistent and organized data set for further processing and analysis.

In block 1330, at least a portion of the organized data is filtered through a frequency-based signal processing filter to remove background noise and interference therefrom. In some embodiments, the frequency-based signal processing filter may be a Butterworth filter.

In block 1340, analytical data associated with one or more foot factors is determined based on the filtered data. In some embodiments, the foot factors may be a step of the user, speed of the user, force and impulse of each step of the user, customized features based on user characteristics, and the like. The analytical data may be determined in a number of ways. In a non-limiting embodiment, the analytical data may be determined by recognizing patterns in the filtered data through a classification algorithm, or a regression algorithm. Additionally or alternatively, the analytical data may be determined by detecting gait features of the user such as, but not limited to, ground contact time of a foot of the user, flight time of the user, a contact time of the foot of the user, a step frequency of the user, a stride length of the user, stride rate of the user, progression line of the user, a foot angle of the user, a gait center of the user, a stepping force of the user, etc.

In block 1350, the determined analytical data is categorized to provide context and insight to the user regarding the user's motion. In some embodiments, the categorization may be based on a type of motion of the user depending on a speed and acceleration of the user, force and impulse of each step of the user, a directional change of the user, etc. Additionally or alternatively, the determined analytical data is categorized based on a left foot or right foot of the user and the observant symmetry of load distribution and performance between the two. Additionally or alternatively, the determined analytical data is categorized based on dispersion of the data across regions, i.e., front portion, middle portion, and rear portion within a left foot of the user, or a right foot of the user.

In some embodiments, the categorized data is further compiled and presented along with a predictive feedback on the motion of the feet of the user. The predictive feedback is determined by a supervised or an unsupervised machine learning algorithm trained on motion data and resulting outputs. In some embodiments, the predictive feedback may include information related to symmetrical distribution of forces on the feet of the user during motion, likelihood of injury of the user, one or more patterns of injury of the user, a recommended course of action to prevent an injury to the user, and the like. In some embodiments, the predictive feedback may be presented along with interactive visualizations to provide context and insight about the motion data to the user. The motion data, the interactive visualizations, and the predictive feedback may be downloaded or exported in various formats by the user for future use, study, and research.

Figure 14:
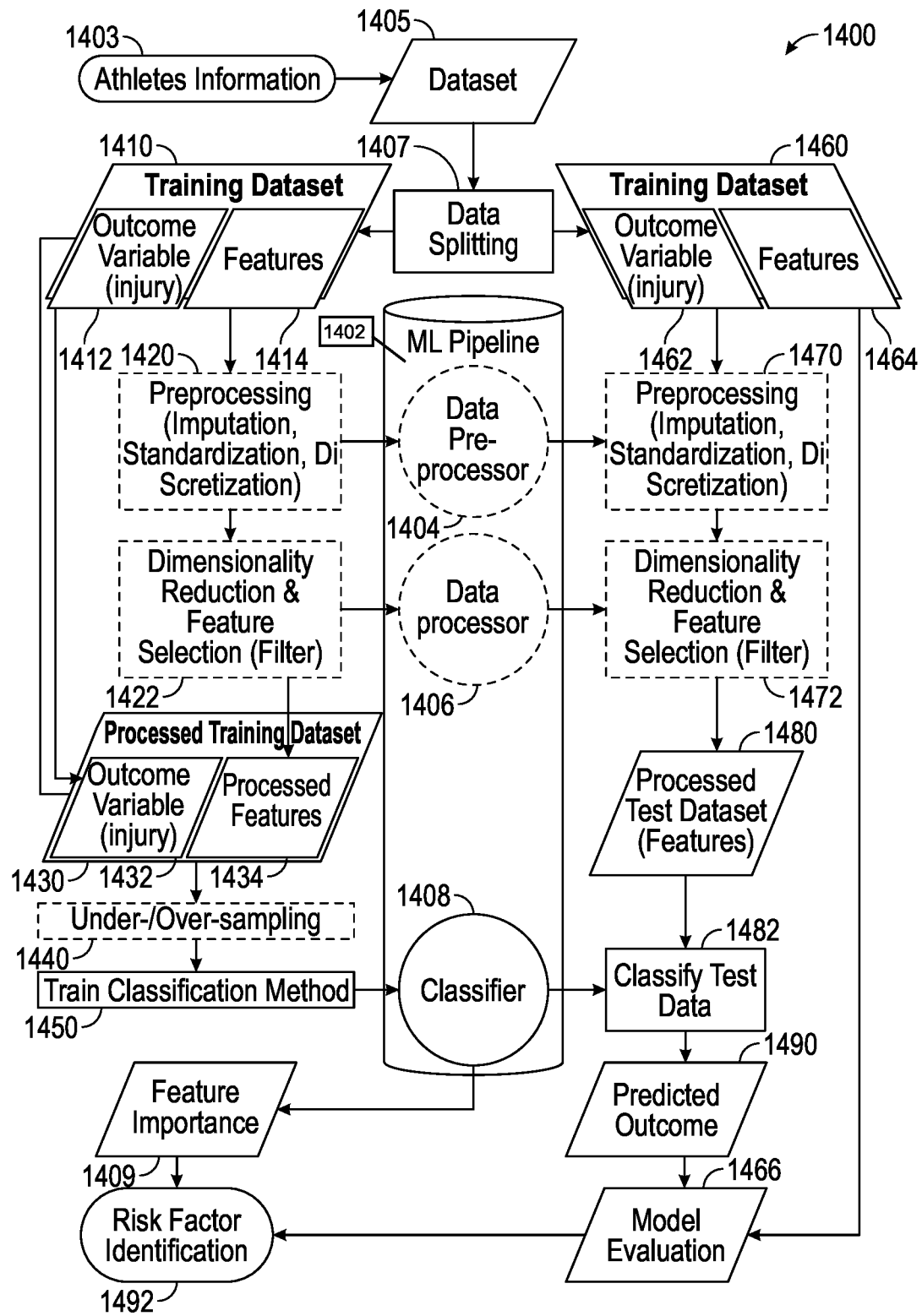
FIG. 14 shows a block diagram of a non-limiting example of a machine-learning architecture used by the data analytics method of FIG. 13, according to certain aspects of the present disclosure.

FIG. 14 shows a block diagram of a non-limiting example of a machine-learning (ML) architecture 1400 used by the data analytics method 1300. In practice, the motion data and the related data analytics are used to detect patterns and determine a probability of injury, based on workload on the feet, number of sessions, etc. The ML architecture 1400 is a merely an example. The ML architecture 1400 includes a central ML pipeline 1402, a data preprocessor 1404, a data processor 1406, and a classifier 1408. Motion data is fed into the ML architecture 1400 to generate features and analytics of the motion data.

In some embodiments, initially, unsupervised ML techniques may be used to detect data groups between individuals, without any additional inputs other than raw motion data from the sole portion 114. Due to the nature of unsupervised learning, there is no information regarding the ML decision-making process. The unsupervised groupings will separate users with similar movement characteristics that is used to deepen insight from concurrently collected injury data. The user or the user's coach can collaborate with the team to standardize the recording process for athletes presenting with musculoskeletal (MSK) complaints or injury, throughout the season. MSK complaint and injury data may then be used as inputs for a supervised ML model aimed at detecting the probability of an athlete having MSK complaint or injury in subsequent training sessions.

The motion data generated may also be synchronized with data generated by another wearable device using time stamps to train a decision-tree classifier or a neural network model that predicts the user's performance and likelihood of injury. The decision-tree classifier is a supervised machine-learning technique that involves asking a series of questions based on different variables to reach a conclusion. The variables include a user's previous health issues, the total distance they have covered in a session and the distance covered at high speed as an example. Other variations that can be used for decision-tree-based methods, are "random forest" or "gradient boosting" techniques, which use multiple decision trees to incrementally improve forecasts. Another machine-learning technology, known as deep neural networks, could yield even greater accuracy.

Advantageously, the systems and methods according to the present disclosure provide for continuous detection of a user's gait, movement, walking, running, weight distribution, standing, posture, and other related physical abilities. This enables continuously measuring and understanding dynamic stress load, particularly cumulative lower limb loading and balance. Further, the systems and methods differentiate between changes in external loading experienced by the user, as well as limb-to-limb symmetry in loading. This aids in generating contexts and insights for a user, particularly in metrics related to load, force distribution, and gait. This helps the users, medical practitioners, and coaches gain a deeper understanding of the physical demands during training, open play, and rehabilitation sessions, as well as understanding how to prevent and predict injuries.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A therapy boot for aquatic based therapy, comprising:
   a foot portion;
   a shank portion disposed adjacently above the foot portion, the shank portion further comprising an inner lining and a first valve, wherein the inner lining is configured to inflate via the first valve and secure a user's foot within the therapy boot with a water-tight seal;
   an inflatable air sleeve including a second valve, the air sleeve configured to be axially wrapped around the shank portion, wherein the second valve is automatically controlled to adjust inflatability of the inflatable air sleeve to maintain neutral buoyancy for the aquatic therapy boot at a desired depth in a water tank during an aquatic therapy session; and
   a sole portion disposed under the foot portion, the sole portion having a plurality of sensors configured to detect motion of the user's foot wearing the therapy boot.

2. The therapy boot of claim 1, wherein the foot portion comprises a vamp portion and a heel portion coupled to a posterior end of the vamp portion.

3. The therapy boot of claim 2, wherein the foot portion includes an inner surface having one or more lateral sensors configured to measure shear force on the therapy boot.

4. The therapy boot of claim 1, wherein the foot portion is shaped based on whether the user is a human, a horse, a camel, or another animal used for racing.

5. The therapy boot of claim 1, wherein the sole portion further comprises:
   a first layer having a power supply device and a processor configured to collect motion data of the user's foot generated from the plurality of sensors; and
   a second layer disposed under the first layer, the second layer having a flexible printed circuit board having the plurality of sensors.

6. The therapy boot of claim 5, wherein the flexible printed circuit board communicatively couples the processor with the power supply device and the plurality of sensors.

7. The therapy boot of claim 5, wherein the flexible printed circuit board is formed from a glass-reinforced epoxy laminate material.

8. The therapy boot of claim 5, further comprising a coaxial antenna cable attached to the foot portion and electronically coupled to the processor.

9. The therapy boot of claim 8, wherein the coaxial antenna cable transmits motion data of the user's foot from the processor to an external computing device.

10. The therapy boot of claim 5, further comprising an energy-harvesting sensor coupled to the foot portion and configured to charge the power supply device from kinetic energy generated by motion of the user's foot.

11. The therapy boot of claim 5, wherein the power supply device comprises a rechargeable lithium polymer battery configured to have a size that conforms to a shape of the foot portion.

12. The therapy boot of claim 5, wherein the motion data is used by (i) a user computing device, (ii) an external computing device, or (iii) both, to present interactive visualizations on the motion of the user.

13. The therapy boot of claim 5, wherein the motion data is used by (i) a user computing device, (ii) an external computing device, or (iii) both to provide a predictive feedback of a probability of injury based on the motion of the user's foot, wherein the predictive feedback is determined by a machine learning algorithm.

14. The therapy boot of claim 13, wherein the machine learning algorithm is one of: (i) a supervised algorithm, or (ii) an unsupervised algorithm.

15. The therapy boot of claim 1, wherein the plurality of sensors include: (i) one or more force-sensitive resistors, (ii) one or more three-axis accelerometers, (iii) one or more three-axis gyroscopes, (iv) one or more magnetometers, (v) one or more temperature sensors, (vi) one or more electromyography sensors, (vii) one or more heart rate sensors, or (viii) any combination thereof.

16. The therapy boot of claim 1, further comprising an inertial sensor coupled to (i) the shank portion, (ii) the foot portion, or (iii) both.

17. The therapy boot of claim 1, wherein the inner lining extends over an entire interior surface of the therapy boot.

18. The therapy boot of claim 17, wherein the inner lining provides a water-tight seal between the user's foot and the interior surface of the therapy boot.

19. The therapy boot of claim 1, wherein the inflation of the air sleeve is controlled by a control console.

20. The therapy boot of claim 19, wherein the inflatable air sleeve comprises a plurality of air chambers and a second valve that fluidly connects the plurality of air chambers with the inner lining.

21. The therapy boot of claim 1, wherein at least one of the foot portion, the shank portion, and the sole portion comprises neoprene.

22. The therapy boot of claim 1, further comprising a supporting base layer conforming in shape to and disposed under the sole portion.

23. An aquatic therapy boot comprising:
   a foot portion;
   a shank portion disposed adjacently above the foot portion;
   a sole portion disposed under the foot portion, the sole portion having a plurality of sensors configured to detect motion of a user's foot wearing the therapy boot in a water tank; and
   an inflatable air sleeve configured to be axially wrapped around the shank portion wherein the inflation of the air sleeve is automatically controlled by a control console to adjust inflatability of the inflatable air sleeve to maintain neutral buoyancy for the aquatic therapy boot in the water tank during an aquatic therapy session.

* * * * *